United States Patent [19]
Yang et al.

[11] Patent Number: 5,940,155
[45] Date of Patent: Aug. 17, 1999

[54] LIQUID CRYSTAL DISPLAYS CONTAINING TILTED OPTICAL AXIS COMPENSATION FILMS HAVING A NEGATIVE BIREFRINGENCE

[75] Inventors: Kei-Hsiung Yang, Katonah, N.Y.; Kun-Wei Lin; Han-Ping David Shieh, both of Hsin-Chu, Taiwan

[73] Assignee: International Business Machines Corporation, Armonk, N.Y.

[21] Appl. No.: 08/929,237

[22] Filed: Sep. 4, 1997

[51] Int. Cl.[6] .................................................. G02F 1/1335
[52] U.S. Cl. .......................... 349/120; 349/102; 349/121
[58] Field of Search .................................... 349/120, 121, 349/118, 180, 181, 102

[56] References Cited

U.S. PATENT DOCUMENTS

| | | | |
|---|---|---|---|
| 5,583,679 | 12/1996 | Ito et al. | 349/120 |
| 5,657,140 | 8/1997 | Xu et al. | 349/120 |
| 5,736,067 | 4/1998 | Kawata et al. | 252/299.5 |

*Primary Examiner*—William L. Sikes
*Assistant Examiner*—Kenneth Parker
*Attorney, Agent, or Firm*—Scully, Scott, Murphy & Presser; Jay P. Sbrollini

[57] ABSTRACT

An optical compensation arrangement using tilted-optical-axis compensation films with negative birefringence for low-twist-angle nematic liquid crystal cells to achieve better viewing angle characteristics than a regular 90°-twist TN cell, with similar high contrast ratio and brightness as the regular TN cell near normal incidence at a comparable operating voltage.

14 Claims, 31 Drawing Sheets

LIQUID CRYSTAL DISPLAYS CONTAINING TILTED OPTICAL AXIS COMPENSATION FILMS HAVING A NEGATIVE BIREFRINGENCE

BACKGROUND OF THE INVENTION

Field of the Invention

The present invention relates generally to low-twist-angle nematic liquid crystal cells with optical compensation for wide-viewing-angle applications, and more particularly pertains to the design of liquid crystal (LC) displays (LCDs) and, particularly, with techniques for maximizing the field of view (or viewing angle) of LCDs while maintaining high contrast ratio viewing from near normal incidence and minimizing variance in relative gray levels over a wide range of viewing angles. These goals are achieved by using low-twist-angle (twist angle from about 30° to about 85°) nematic liquid crystal cells with optical compensation films which have a negative birefringence and tilted optical axes away from the planes of the optical compensation films.

In the following description of the present invention, TN (twisted nematic) and LTN (low angle twisted nematic) are used to represent twisted nematic liquid crystal displays with a twist angle of 90° or lower than 90°, respectively. For LTN, this usually means a twist angle from about 85° to about 30°. A TN display was invented by Schadt and Helfrich in 1971 (M. Schadt and W. Helfrich, Appln. Phys. Lett. V. 18, 127 (1971)). A liquid crystal (LC) cell, in general, consists of two substrates forming a cavity between them to contain the nematic LC mixture. Between each substrate and the LC medium, there exist a conductive electrode coated on the substrate and an LC alignment layer in direct contact with the LC medium to align the adjacent LC directors into one direction. For a TN LC cell, the direction of LC directors adjacent to one of the substrates is orthogonal (or 90°) to the direction of LC directors adjacent to the other substrate so that the LC directors in the cell twist 90° from one substrate to the other.

Because of their maturity in manufacture and their sufficiency in performance, TN liquid crystal (LC) displays have been widely used in commercial thin-film-transistor (TFT) driven flat panel liquid crystal displays (LCDs). The strong viewing-angle dependencies of the contrast ratio, the brightness, and the grayscale of the TFT-driven TN displays have been recognized as major weaknesses for these displays. To illustrate the viewing-angle problem of the TN LC cells, a TN orientation is defined with different viewing directions.

FIG. 1 shows a TN cell 10 with two substrates 12 and 14. A rubbed polyimide film (not shown in FIG. 1) is usually used to align the LC directors. The rubbing directions of the polyimide films on substrates 12 and 14 are shown as dashed arrow 16 and solid arrow 18, respectively.

For display applications, the TN cell is placed between two polarizers 20, 22 with the transmitting axes of the polarizers being either parallel or perpendicular to the adjacent LC directors. If the transmitting axes 24, 26 of the two polarizers sandwiching the TN cell are crossed to each other, the TN display is operated in a normally-white case where the quiescent state of the TN cell is the bright state of the display. On the other hand, if the axes 24, 26 are parallel to each other, the TN display is operated in a normally-black case where the quiescent state of the TN cell represents the dark state. For the normally-white case, there are two optical Eigen modes, the ordinary-ray (o-) and the extra-ordinary-ray (e-) modes, in which the optical field propagates either parallel or perpendicular to the nematic LC directors in the TN cell, respectively. Such e- and o- modes are illustrated in FIG. 1 where the transmitting axes of the polarizers 20 and 22 are shown.

With the configuration of the TN display shown in FIG. 1, by facing the display, four viewing zones can be defined, an upper viewing zone for viewing from the 12 o'clock direction, a lower viewing zone for viewing from the 6 o'clock direction, a left viewing zone for viewing from the 9 o'clock direction, and a right viewing zone for viewing from the 3 o'clock direction. The sign of angle for the upper and right viewing zones are positive while the sign of angle for the lower and left viewing zones are negative. Traditionally, the o-mode has been used for bi-level displays. Recently, Takano, et al have carried out a detailed comparison between the o-and e-modes of NW, first-minimum TN cells for analog-grayscale full color displays (H. Takano, M. Ikezaki, and S. Suzuki, "Threshold Voltage Biased E-mode TN LCD-Optimum Optical Design for Grayscale Applications," the IV International Topical Meeting on Optics of Liquid Crystals, Oct. 7–11, 1991, Cocoa Beach, Fla.). They paid particular attention to optimizing the angular region that preserves a proper grayscale order (no grayscale reversal), i.e., minimizing the angular region of grayscale reversals for ratios of eight gray levels. They concluded that the e-mode with a near threshold-voltage bias is superior to the o-mode for analog-grayscale applications. For the rest of the description of the present invention, the e-mode is used as an example. The results are applicable to the o-mode as well.

To illustrate the viewing-angle problem of TN for analog-grayscale displays, FIG. 2 shows transmittance as a function of applied voltage for a typical TN cell when the TN cell is being viewed from five different directions. Curves 1, 2, 3, 4 and 5 in FIG. 2 correspond respectively to viewing from normal incidence, 40° from the left viewing zone, 50° from the right viewing zone, 30° from the lower viewing zone, and 30° from the upper viewing zone, where the angles in degrees are defined as the angles of viewing direction with respect to a normal to the display panel. FIG. 2 illustrates that, at a given voltage applied to the TN cell, the brightness (or the contrast ratio) of the display appears different from the above-mentioned five different viewing directions.

To further quantify the viewing-angle problems of a typical TN cell, eight different voltage levels were applied to the TN cell to achieve eight approximately equally-spaced gray levels starting from the brightness to the darkest states of the display. The change of these eight levels as a function of viewing angles in the horizontal and vertical viewing directions are shown in FIGS. 3 and 4, respectively, for a typical TN cell. As shown in FIG. 3, at a horizontal viewing angle of either +40° or −40°, the transmittance of the gray level 8 (darkest level near normal incidence) is higher than that of the gray level 7. In this case, we have contrast or gray-level reversal between gray level 8 (g8) and gray level 7 (g7) for these viewing directions. The display will appear annoying if a grayscale reversal occurs between any two gray levels from level 1 to level 8.

FIG. 5 shows iso-contrast curves as a function of viewing angle for a typical TN display. It can be seen that the contrast ratio decreases when the viewing angle deviates further from normal incidence. The TN cell usually has the best contrast ratio near normal incidence. FIG. 5 also shows that, outside the thick solid curves, image (or grayscale) reversal occurs so that the display appears annoying when viewed from these viewing zones having image reversals.

The narrow viewing-angle characteristics of a TN cell are caused by a change of retardation of the TN cell when the viewing direction is changed. To a first degree of approximation, the retardation of a nematic LC cell at normal incidence is proportional to $d\Delta n$, where d is the cell gap and $\Delta n$ is the birefringence of the LC medium. When the LC cell is viewed from an oblique direction, the retardation becomes larger because the effective cell-gap becomes larger at this oblique viewing direction. Therefore, it is expected that the viewing-angle characteristics of a TN cell can be improved if one uses a low $d\Delta n$ for the TN cell. However, as the $d\Delta n$ of the TN cell is lower than approximately 0.48 $\mu$m, the brightness of the display is reduced. In order to maintain high brightness, we can reduce the twist angle of the LC cell from 90° as the $d\Delta n$ is reduced. Therefore, LTN cells can have wider viewing angles than TN cells because the LTN cells have lower values of $d\Delta n$ than TN cells for about the same brightness. The major problem associated with LTN cells is that the contrast ratio around normal incidence decreases as the twist angle of the LTN cell decreases. Therefore, a higher operating voltage is required for LTN cells to achieve similar contrast ratios at normal incidence as the regular TN cells. Higher operating voltage implies higher cost and larger power consumption. In other words, LTN cells may have about the same brightness as TN cells and have wider viewing angles than TN cells but the best viewing zone for LTN cells is no longer along the direction of normal incidence. Since the displays are most frequently viewed along the normal incidence, it is important to shift the best viewing zone of LTN cells into near normal incidence without raising the operating voltage.

One prior art approach by Hirakata, et al. compensates a 70°-twist LTN cell with uni-axial optical compensation films having positive birefringence (J. I. Hirakata, H. Abe, I. Hiyama, K. Kondo, SID 95 DIGEST, (1995) p. 563.). FIG. 6 illustrates this prior art approach. Imagine the paper containing FIG. 6 being the display. We view the display just as we view FIG. 6, and the incident light impinges from the back side of the display with the viewer situated at the front side. The transmitting axes of the polarizer at the back side and the analyzer at the front side are parallel to the x-axis and y-axis, respectively, as shown in FIG. 6. The LC directors align along the $n_1$ direction adjacent to the back substrate. The LC directors align along the $n_2$ direction adjacent to the front substrate. The LC directors in the LTN cell twist from the $n_1$ direction toward the $n_2$ direction with a total twist angle. The angle, $\alpha$, between $n_1$ and the x-axis is approximately equal to the angle (also $\alpha$) between $n_2$ and the y-axis. From FIG. 6, it can be seen that $2\alpha+$ is approximately equal to 90°. Between the polarizer and the LC cell, there is one sheet of optical compensation film. The optical compensation film is uni-axial with its optical axis along the direction $c_1$. The direction of $c_1$ is perpendicular to the direction of $n_1$. There is another sheet of similar optical compensation film between the LC cell and the analyzer. The optical axis of this second compensation film is along the $c_2$ direction. The direction of $c_2$ is also perpendicular to the direction of $n_2$. Both $c_1$ and $c_2$ are in the plane of the compensation film. The $d\Delta n$ of the 70°-twist cell is about 0.38 $\mu$m, and each compensation film has a positive birefringence and a retardation about 0.023 $\mu$m. Retardation films with such a small retardation of about 0.023 $\mu$m are expensive because it is difficult to maintain a uniform small retardation within about ±3% across the whole display area in order to achieve a display with good uniformity.

SUMMARY OF THE INVENTION

Accordingly, it is a primary object of the present invention to provide low-twist-angle nematic liquid crystal cells with optical compensation for wide-viewing-angle applications.

Pursuant to the subject invention, wide-viewing-angle LCDs over the 90°-twist TN are achieved by using low-twist-angle nematic LC cells compensated by films with negative birefringence and a tilted optical axis. The inventive wide-viewing-angle LCDs have the same high contrast ratio and brightness near normal incidence and same saturation voltage as the 90°-twist TN so that all the drivers designed for the 90°-twist TN can be used therefor.

In accordance with the teachings herein, the present invention provides a liquid crystal (LC) display for viewing at different angles with respect to a normal axis perpendicular to the display. The LC display comprises a polarizer layer having an absorption axis, and a transmission axis perpendicular to the absorption axis. An analyzer layer also has an absorption axis, substantially perpendicular to the absorption axis of the polarizer layer, and a transmission axis perpendicular to its own absorption axis. A liquid crystal cell is disposed along a substrate plane between the polarizer layer and the analyzer layer, and has a liquid crystal medium therein between first and second sides of the liquid crystal cell. The LC medium defines a twist angle $\phi$, and has liquid crystal directors exhibiting a small pretilt angle from the substrate plane, and an azimuthal twist angle through the liquid crystal medium with respect to an axis perpendicular to the substrate plane. A first electrode is positioned proximate to the first side of the liquid crystal cell, and a second electrode is positioned proximate to the second side thereof, to apply a voltage across the liquid crystal medium. Pursuant to the present invention, a first optical compensator, having a negative birefringence and an optical axis, is disposed between the polarizer layer and the liquid crystal cell, and a second optical compensator, also having a negative birefringence and an optical axis, is disposed between the analyzer layer and the liquid crystal cell.

In greater detail, projections of the optical axes of the first and second optical compensators onto a plane defined by each optical compensator bisect the angle defined between the transmission axes of the polarizer layer and the analyzer layer, and also bisect the azimuthal twist angle of the liquid crystal medium. The liquid crystal medium preferably has a positive dielectric anisotropy, a twist angle $\phi$ in the range from 30° to 85°, and a $d\Delta n$ from 0.2 to 0.55 $\mu$m, where d and $\Delta n$ are the cell gap and the birefringence of the liquid crystal medium, respectively.

The first and second optical compensators preferably have a retardation in the range from −20 to −400 nm, and the optical axes thereof define a tilt angle in the range from 5 to 85° from a normal to the optical compensator. Moreover, the tilt angle of the optical axis of the first optical compensator is approximately equal to the tilt angle of the optical axis of the second optical compensator.

The first and second optical compensators can each be formed by an optical compensation film comprised of a uniaxial optical material with negative birefringence, where the index of refraction along an optical axis, 'ne', is smaller than the index of refraction perpendicular to the optical axis, 'no'. The optical axis of the optical compensation film tilts with an angle $\ominus$ with respect to a normal thereto, and the tilt angle $\ominus$ is in a range of from 10 to 40°.

The optical compensation films can be of discotic liquid crystalline material or discotic liquid crystalline polymers having one or more of the components hexa-n-alkanoates of benzene, hexa-substituted anthraquinones, tri-substituted benzenes, bipyrene derivatives, scylloinosithe hexa-acetate, and octa-substituted phthalocyanide derivatives.

In a first disclosed embodiment of the liquid crystal display, the azimuthal twist angle through the liquid crystal medium is approximately 80°, with dΔn of the liquid crystal medium having values in the range from 0.40 to 0.46 μm. The first and second optical compensators have retardations in the range from −60 nm −120 nm, and the tilt angles of the optical axes of the first and second optical compensators is in the range from 10 to 40° from a normal thereto.

In a second disclosed embodiment of the liquid crystal display, the azimuthal twist angle through the liquid crystal medium is approximately 70°, with dΔn of the liquid crystal medium having values in the range from 0.35 to 0.44 μm. The first and second optical compensators have retardations in the range from −140 to −180 nm, and the tilt angles of the optical axes of the first and second optical compensators is in the range from 10 to 40° from a normal thereto.

In a third disclosed embodiment of the liquid crystal display, the azimuthal twist angle through the liquid crystal medium is approximately 60°, with dΔn of the liquid crystal medium having values in the range from 0.32 to 0.43 μm. The first and second optical compensators have retardations in the range from −120 to −220 nm, and the tilt angles of the optical axes of the first and second optical compensators is in the range from 10 to 40° from a normal thereto.

BRIEF DESCRIPTION OF THE DRAWINGS

The foregoing objects and advantages of the present invention for low-twist-angle nematic liquid crystal cells with optical compensation for wide-viewing-angle applications may be more readily understood by one skilled in the art with reference being had to the following detailed description of several preferred embodiments thereof, taken in conjunction with the accompanying drawings wherein like elements are designated by identical reference numeral throughout the several views, and in which.

DETAILED DESCRIPTION OF THE DRAWINGS

Figure 7:
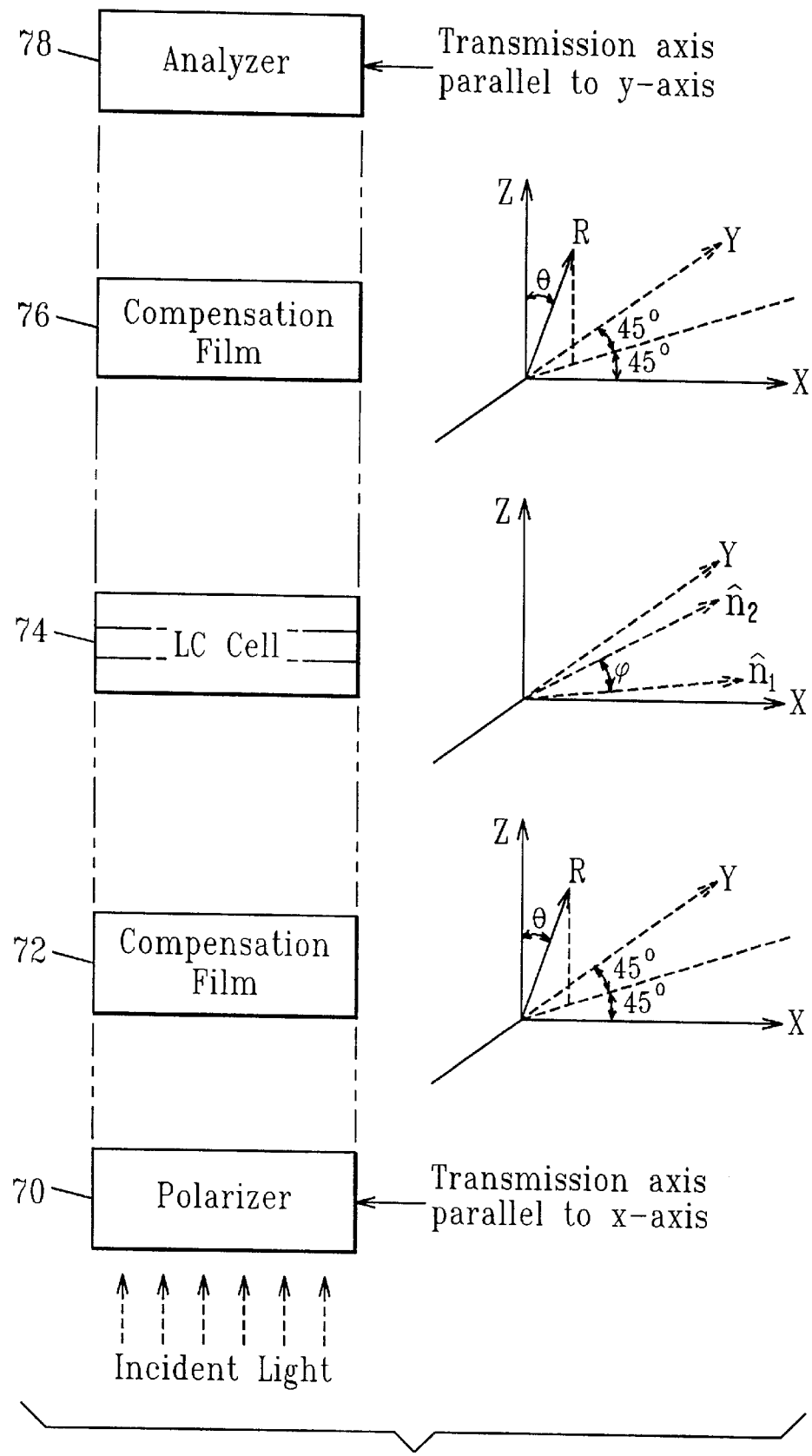
FIG. 7 depicts the approach of the present invention wherein represents the twist angle of the LTN cell, and R is the direction of the optical axis of a compensation film with negative birefringence.
Figure 8:
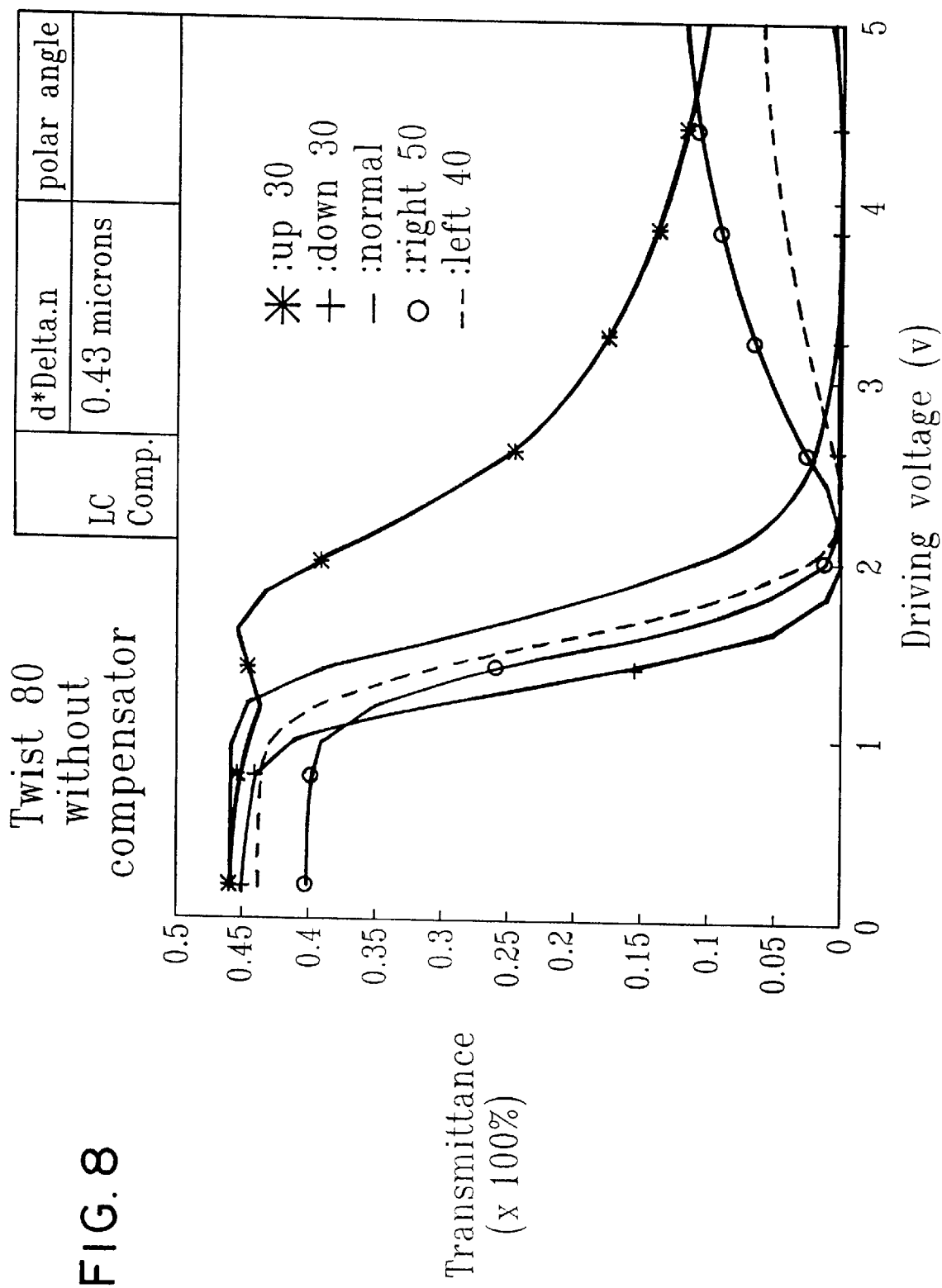
FIG. 8 shows curves of transmittance versus the applied voltage using different viewing directions as parameters for an 80°-twist cell.
Figure 9:
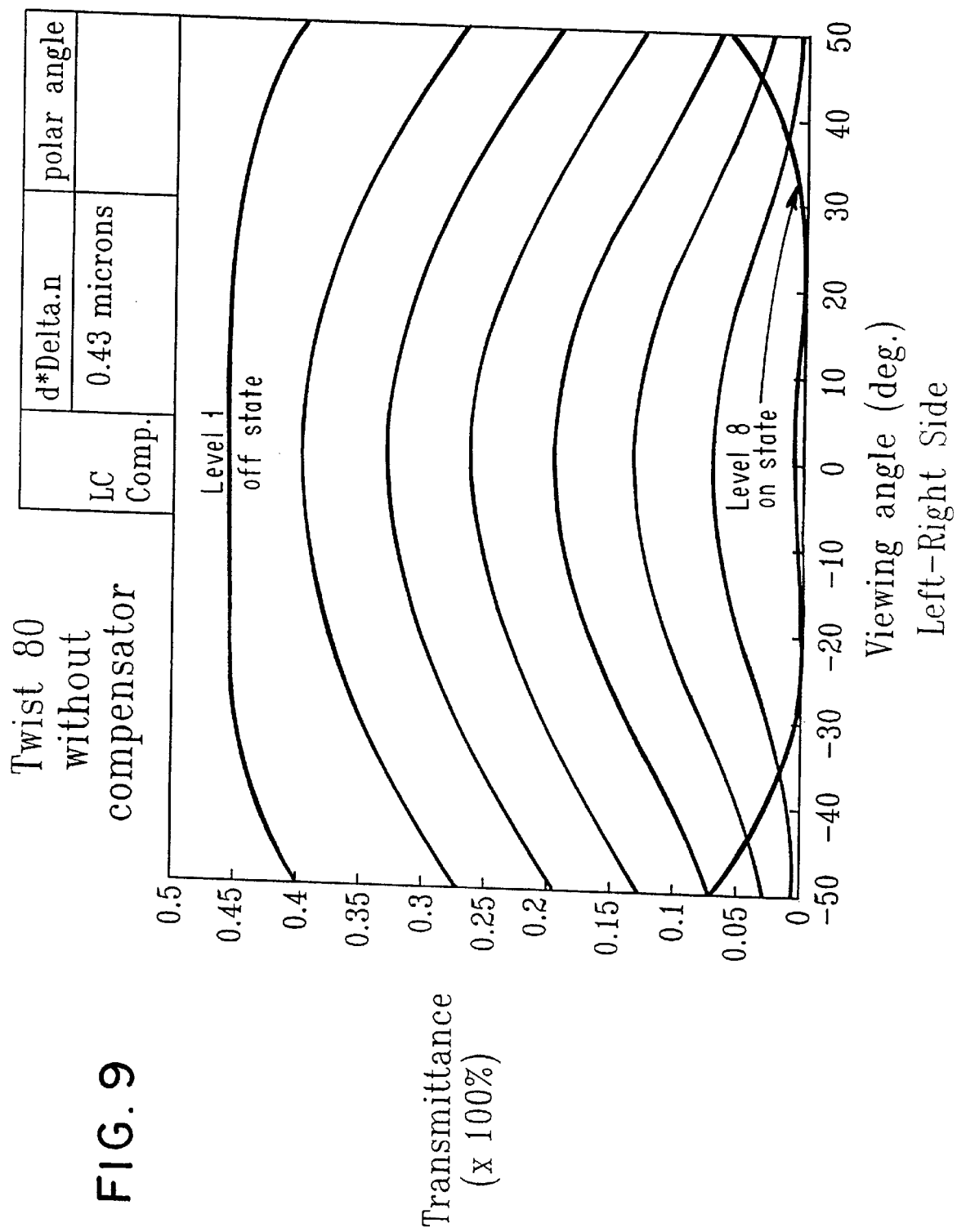
FIG. 9 shows curves of 8-gray level transmittances versus the horizontal viewing angle for the 80°-twist cell.
Figure 10:
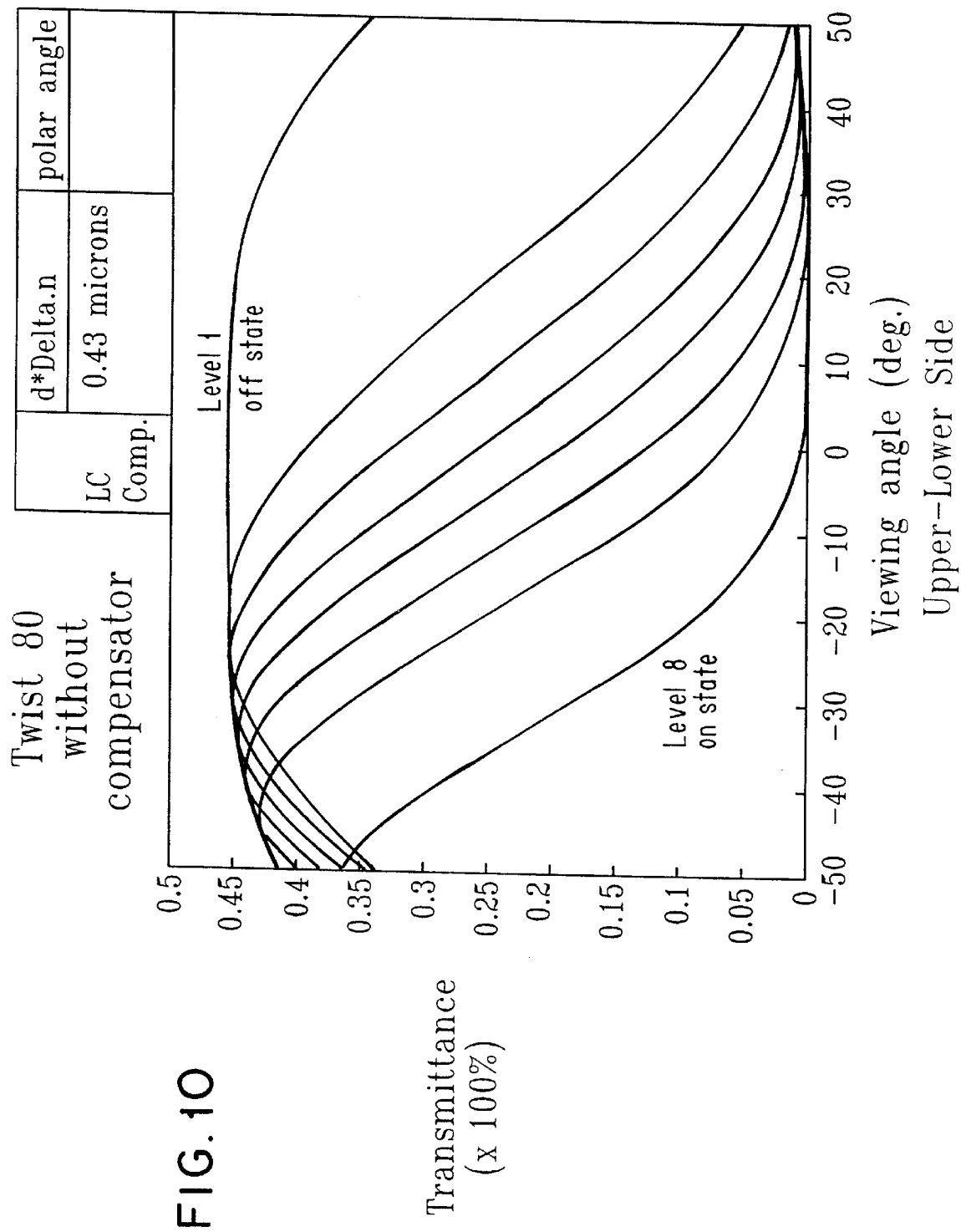
FIG. 10 shows curves of 8-gray level transmittances versus the vertical viewing angle for the 80°-twist cell.

Referring to the drawings in detail, FIG. 7 shows an exemplary embodiment of the present invention. Proceeding from the bottom to the top of the Figure are, in sequence, a polarizer 70, a compensation film 72, an LC cell 74, another compensation film 76, and an analyzer 78. The polarizer 70 is arranged in such a way that its absorption axis is along the y-axis and its transmission axis is along the x-axis. The two compensation films 72 and 76 sandwiching the LC cell 74 have a negative birefringence with tilted optical axes, and are arranged in the same way with their optical axes, R, tilted at an angle θ away from the z-axis (the normal direction of the film) and its projection onto the x,y-plane bisecting the x- and y-axes as shown in FIG. 7. The LC cell 74 has a twist angle φ, typically from 30 to 85°. The LC directors twist from the lower substrate of the cell 74 toward the upper substrate of the cell 74 with a twist angle φ. The angle between the x-axis and the LC directors adjacent to the lower substrate of the LC cell 74 is designed to be about 0.5×(90°−φ), which is approximately equal to the angle between the y-axis and the LC directors adjacent to the upper substrate of the LC cell 74. In addition, in the off-field state (i.e., when no voltage is applied across the LC cell 74), the LC directors across the LC cell 74 have a uniform small pretilt angle, which is preferably less than 10°, with respect to the substrate planes. The analyzer 78 is arranged in such a way that its absorption axis is along the x-axis and its transmission axis is along the y-axis.

According to the arrangement of the invention shown in FIG. 7, the lower viewing zone is defined within the quadrant with three sides bounded by the y-o-z, x-o-z, and x-o-y planes. The upper viewing zone is defined within the quadrant with three sides bounded by the (-y)-o-z, (-x)-o-z, and (-x)-o-(-y) planes. The left viewing zone is defined within the quadrant with three sides bounded by the y-o-z, (-x)-o-z, and (-x)-o-y planes. The right viewing zone is defined within the quadrant with three sides bounded by the (-y)-o-z, x-o-z, and x-o-(-y) planes.

The optical compensation films are made mainly of uniaxial optical material with negative birefringence where the index of refraction along the optical axis, 'ne', is smaller than that perpendicular to the optical axis, 'no'. The optical axis of the optical compensation film tilts with an angle $\ominus$ with respect to the normal of the film. Across the film normal, the tilt angle $\ominus$ is more or less uniform throughout the film. The values of $\ominus$ are preferably from 10 to 40 deg. The optical compensation films are preferably made of discotic liquid crystalline material or discotic liquid crystalline polymers containing main ingredients such as hexa-n-alkanoates of benzene, hexa-substituted anthraquinones, tri-substituted benzenes, bipyrene derivatives, scyllo-inosithe hexa-acetate, and octa-substituted phthalocyanide derivatives. Two important parameters, the retardation and $\ominus$ are sufficient to characterize optical compensation films suitable for the present invention. Optical compensation films made of other materials than that described above can also be used for the present invention provided that they have similar values of retardation and $\ominus$.

Both numerical simulations and experimental results have been used to study the viewing-angle characteristics of the present invention to compare with the viewing-angle characteristics of a regular 90°-twist TN. For simulations and experiments, nematic mixture, MLC-6221-000 from EM Merck, Darstadt, Germany, was used. The results for the 90°-TN are shown in FIGS. 2 to 5 using a dΔn=0.46 μm.

Figure 1:
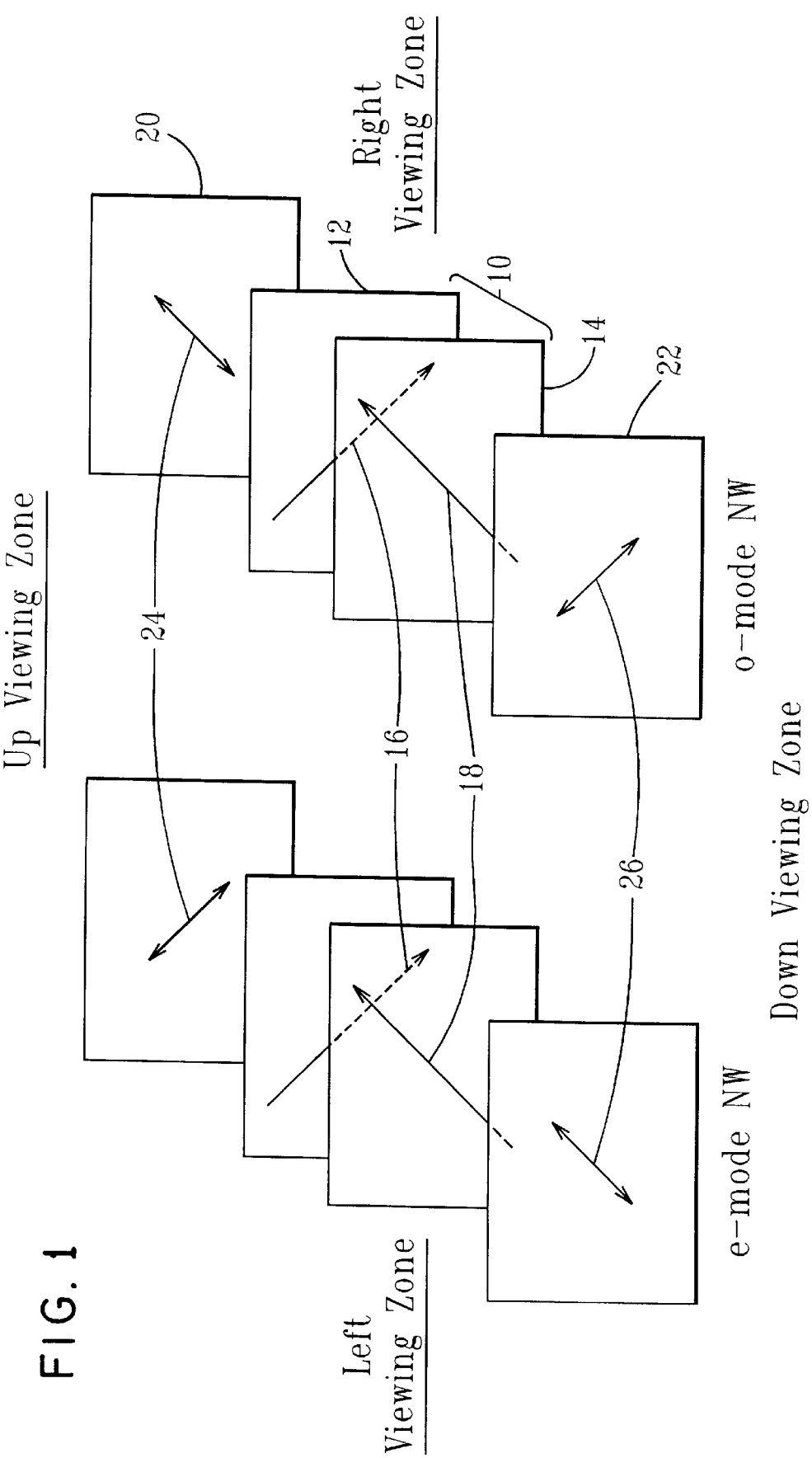
FIG. 1 shows the structure of a TN display operated in a normally-white case having extraordinary (e-) and ordinary (o-) modes. The orientation of the TN cell is chosen to define the left, right, upper, and lower viewing zones.
Figure 2:
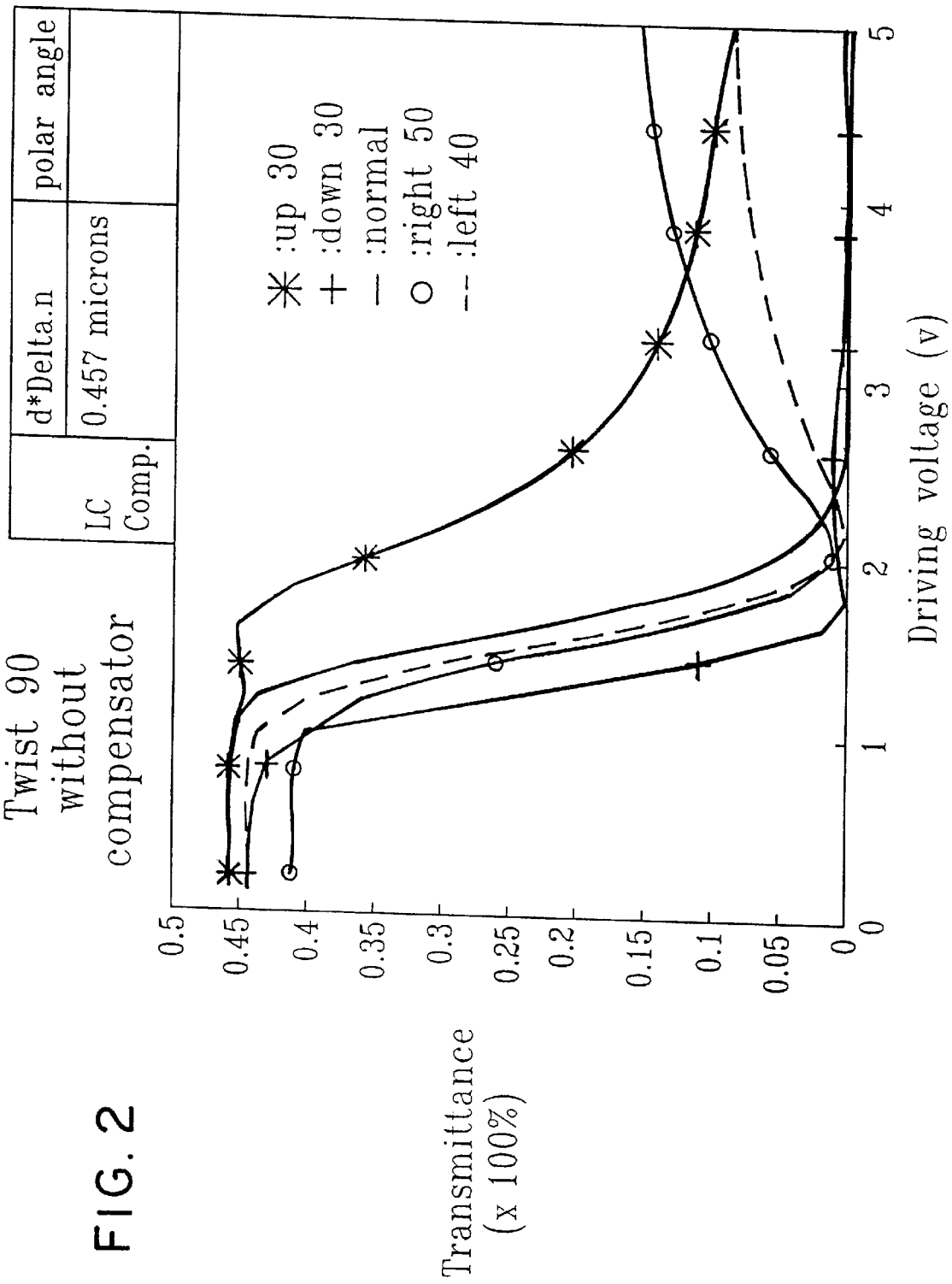
FIG. 2 shows the transmittance-versus-applied voltage curves for a TN cell using five different viewing directions as parameters. It shows that the contrast ratio of the TN cell depends strongly on the viewing direction.
Figure 3:
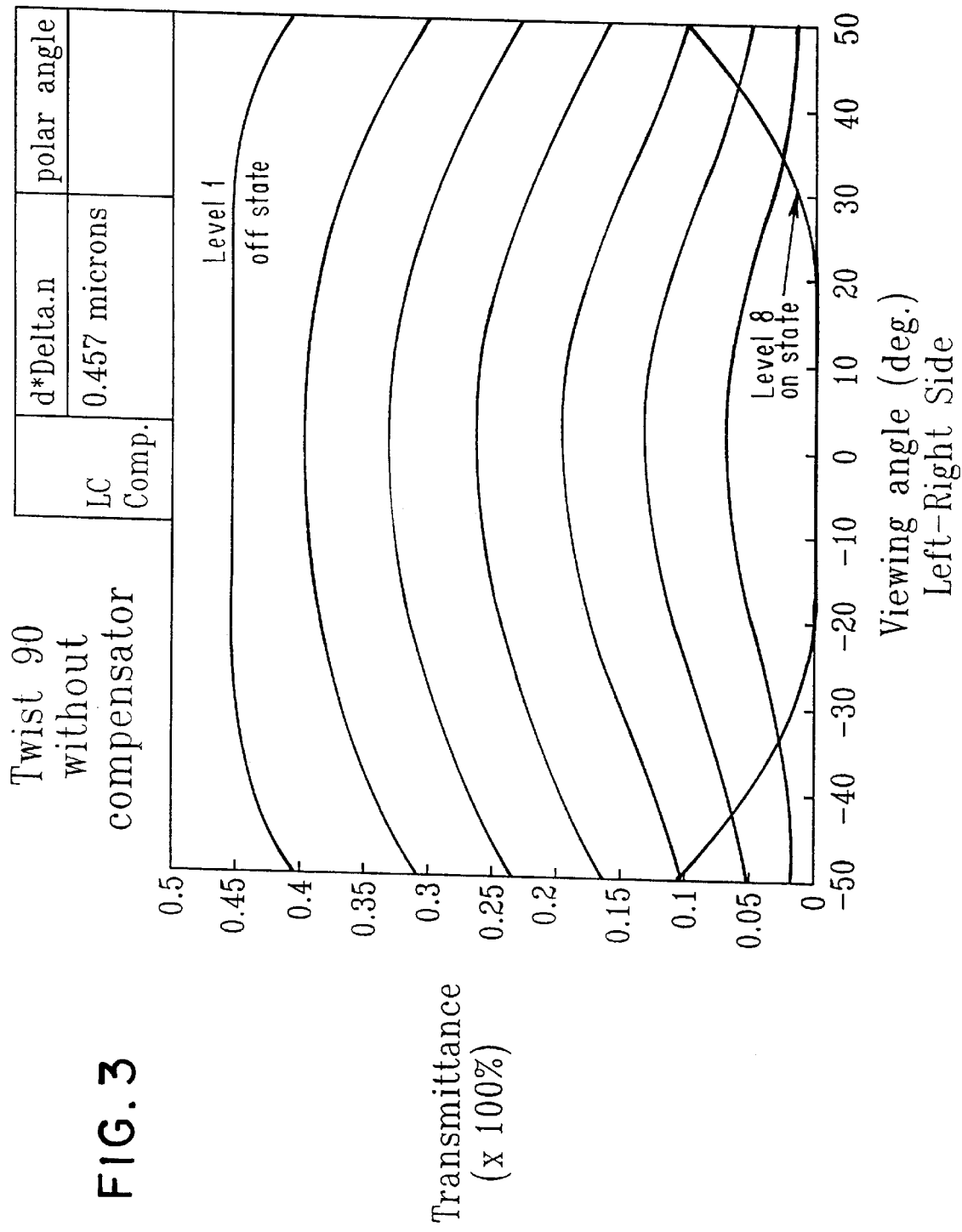
FIG. 3 shows 8-gray-level transmittances versus the horizontal viewing angle.
Figure 4:
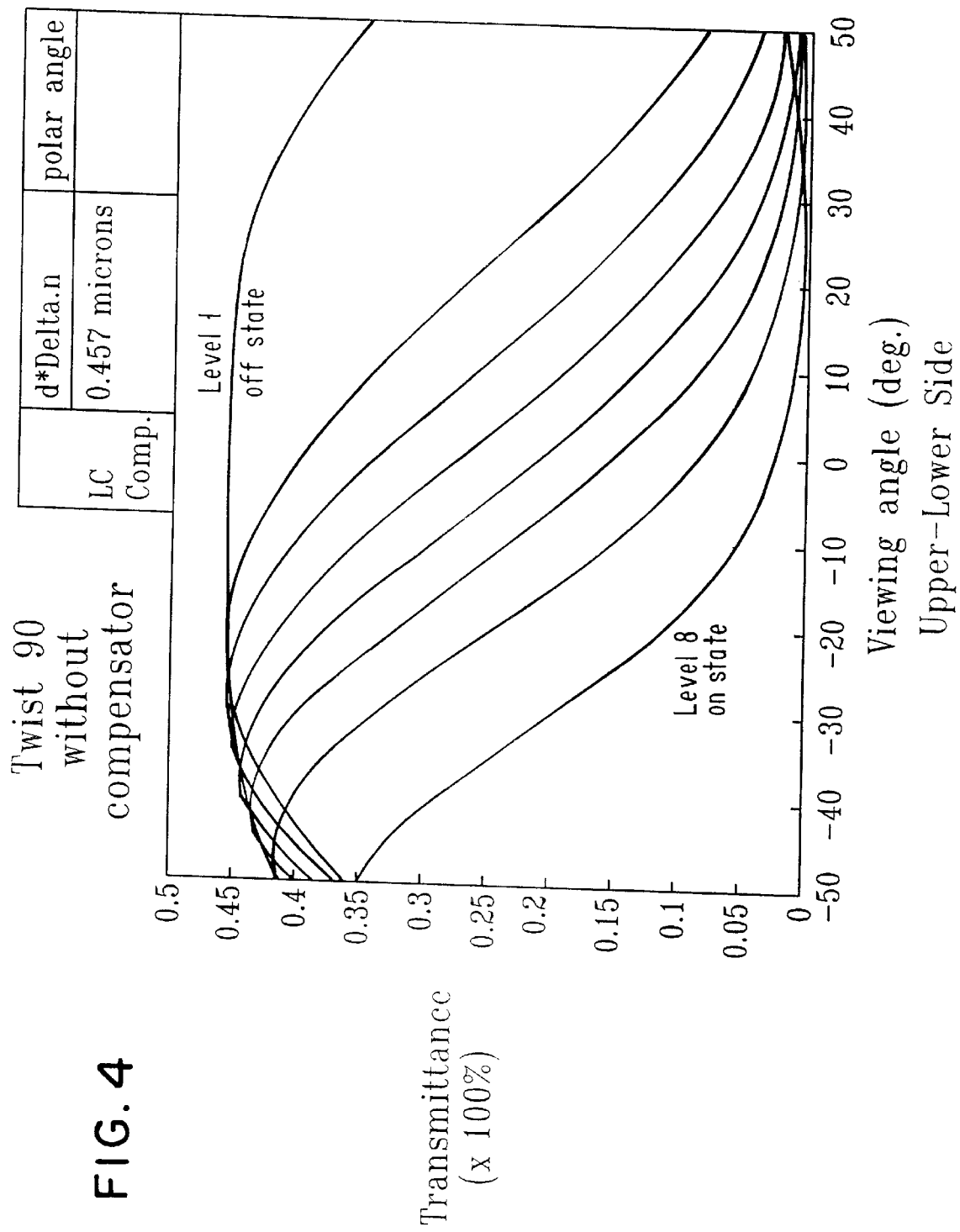
FIG. 4 shows 8-gray-level transmittances versus the vertical viewing angle.

FIG. 2 shows the transmittance versus driving voltage at different viewing directions. For these curves, the voltage varied from 0.2 to 5 V with steps of 0.2 V. Based on the transmittance versus voltage curve at normal incidence, the voltage levels were determined corresponding to 8 gray levels using curve-fittings. The voltage for the 8th gray level was chosen at 3.2 V for all of the computations presented hereinbelow. FIGS. 8 to 11 show curves correspondingly similar to the curves of FIGS. 2 to 5 for the case of an 80°-twist cell with dΔn=0.43 μm. FIGS. 12 to 15 show curves correspondingly similar to the curves of FIGS. 8 to 11 for the case of an 80°-twist cell with dΔn=0.43 μm and with two compensation films as shown in FIG. 7, with θ=20° and the retardation of the compensation film equal to −90 nm, which is defined as the thickness of the compensation film multiplied by 'ne' − 'no', where 'ne' and 'no' are the indices of refraction of the extraordinary and ordinary rays for the compensation film, respectively. FIGS. 16 to 19 show curves correspondingly similar to the curves of FIGS. 2 to 5 for a 70°-twist case with dΔn=0.38 μm. FIGS. 20 to 23 show curves correspondingly similar to the curves of FIGS. 16 to 19 with two compensation films as shown in FIG. 7, with θ=20° and a retardation of compensation film of −140 nm. FIGS. 24 to 27 show curves correspondingly similar to the curves of FIGS. 2 to 5 for the 60°-twist case with dΔn=0.35 μm. FIGS. 28 to 31 show curves correspondingly similar to the curves of FIGS. 24 to 27, with two compensation films as shown in FIG. 7, with θ=20° and a retardation of compensation film of −170 nm.

Figure 5:
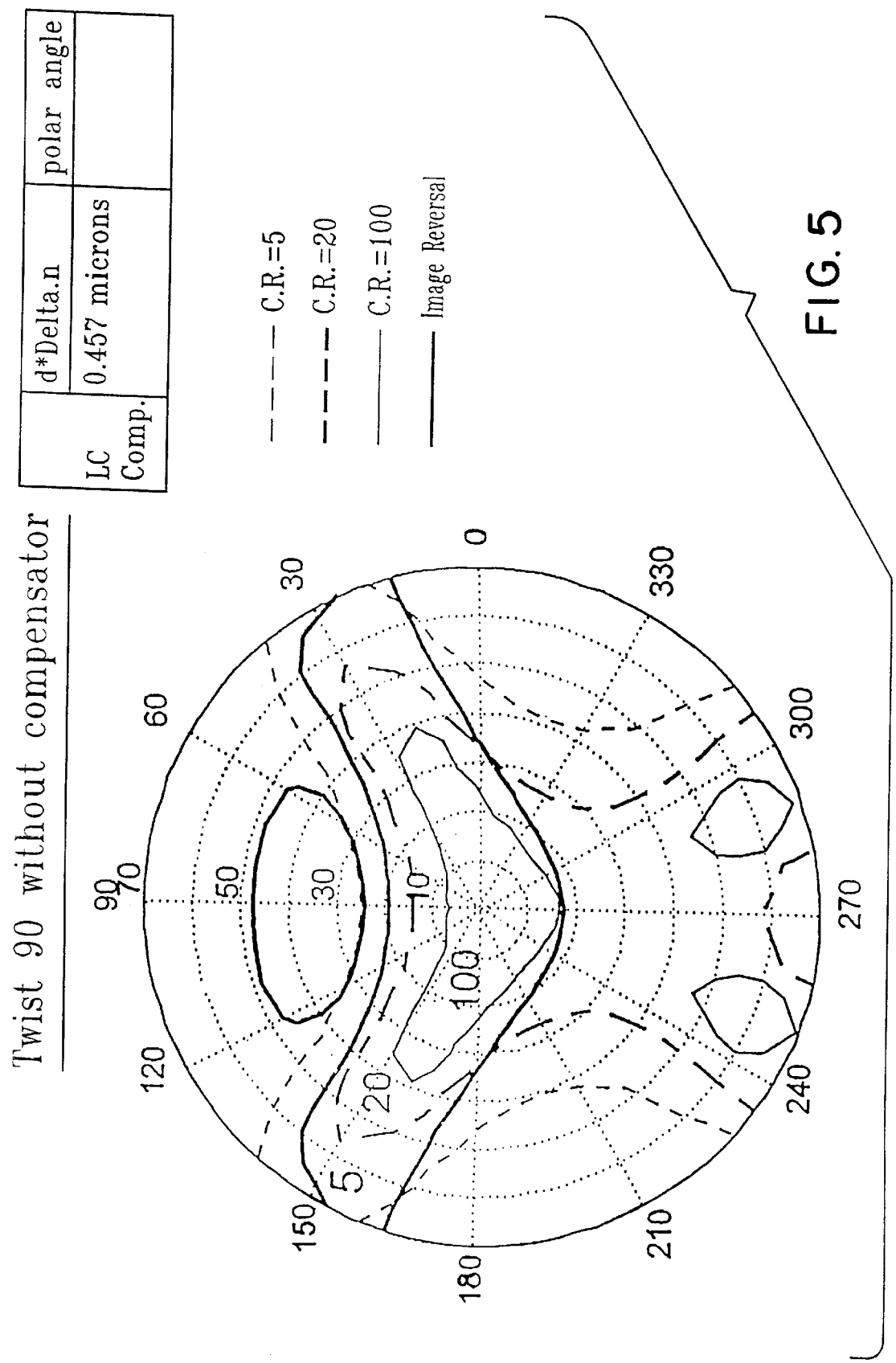
FIG. 5 shows iso-contrast curves with contrast ratios of 5, 20, 100 wherein the curves indicate the beginning of image reversal. For the upper viewing zone, the image-reversal curves indicate the boundaries of image reversal occurring between the gray levels 1 and 2, or the gray levels 2 and 3, or the gray levels 3 and 4. For the lower viewing zone, image-reversal curves indicate the boundaries of image reversal occurring between the gray levels 7 and 8.
Figure 6:
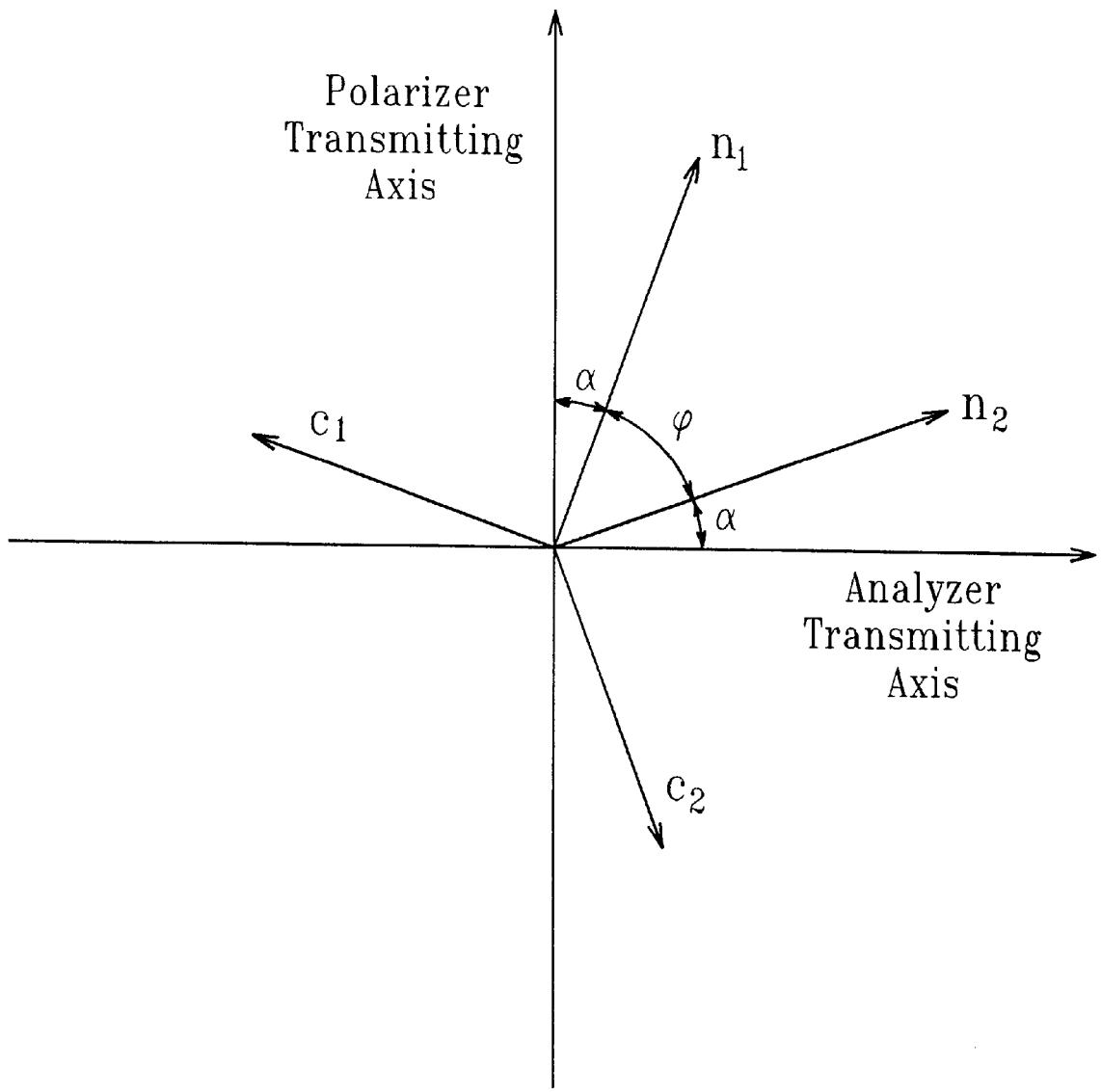
FIG. 6 illustrates a prior art approach using optical compensation films with positive birefringence and the optical axis in the film plane for LTN cells.
Figure 11:
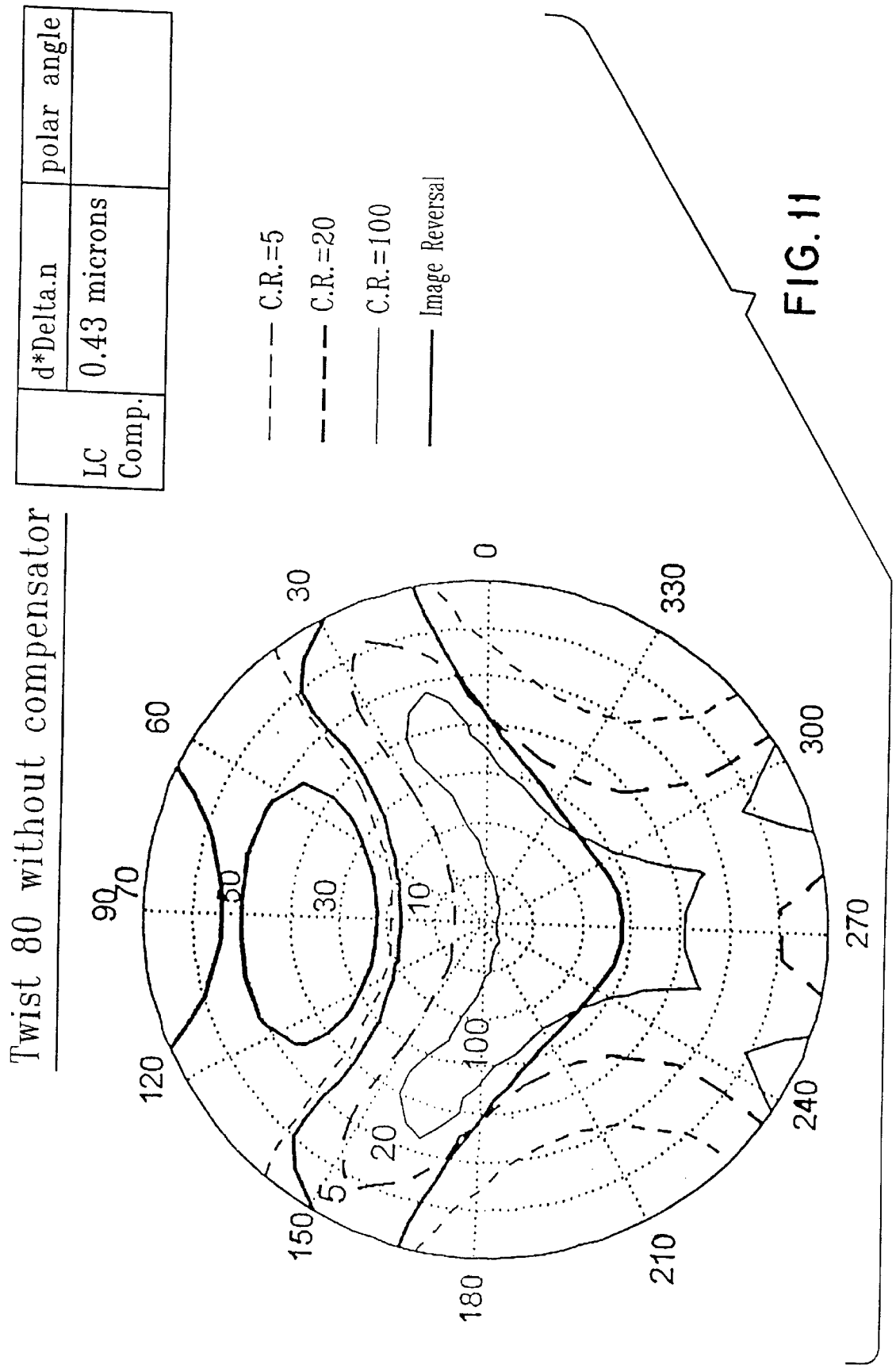
FIG. 11 shows curves of iso-contrast and the boundary of image-reversal curves for the 8°-twist cell.
Figure 12:
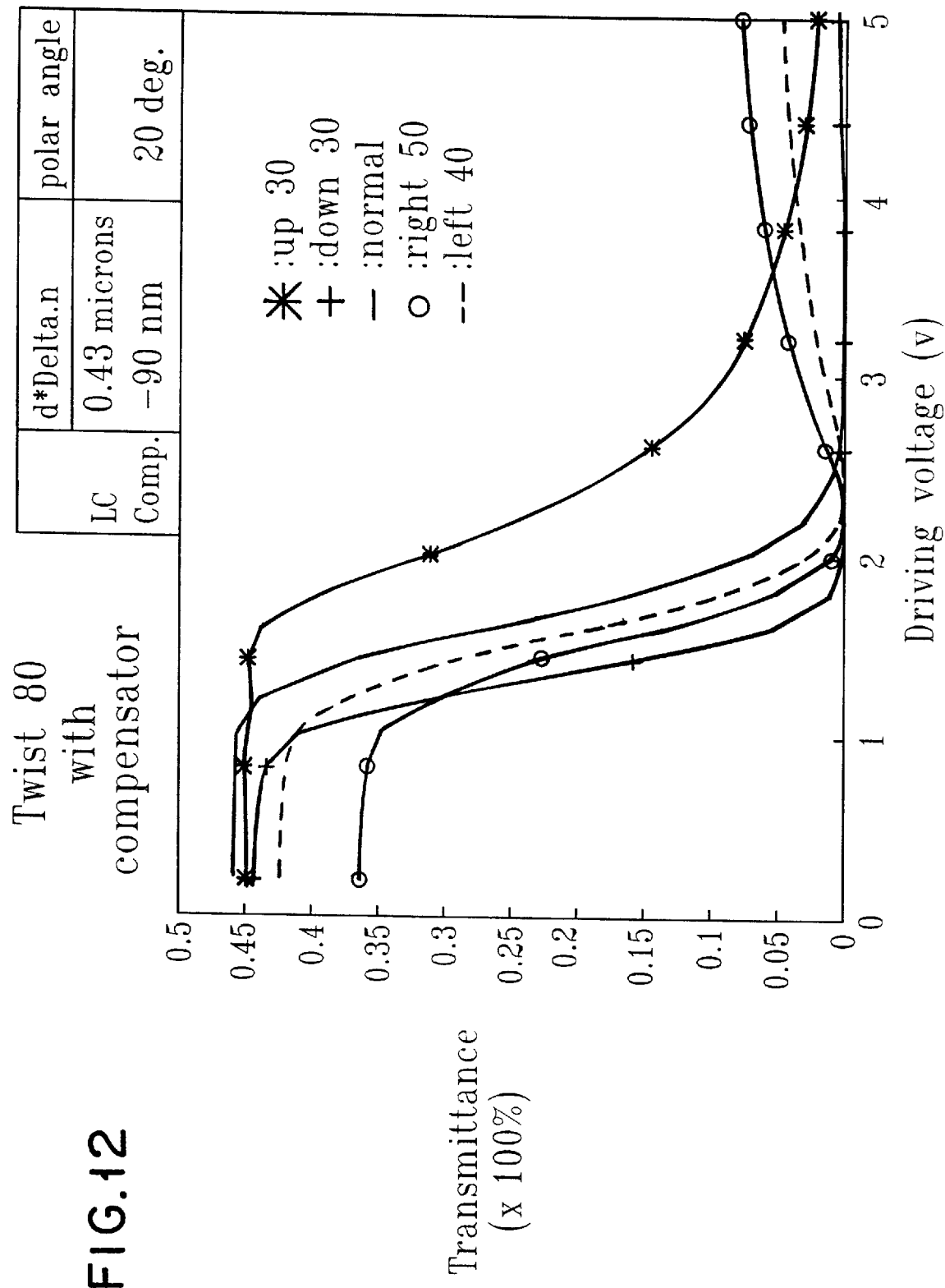
FIG. 12 shows curves of transmittance versus the applied voltage for different viewing directions for an 80°-twist cell with optical compensation as shown in FIG. 7.
Figure 13:
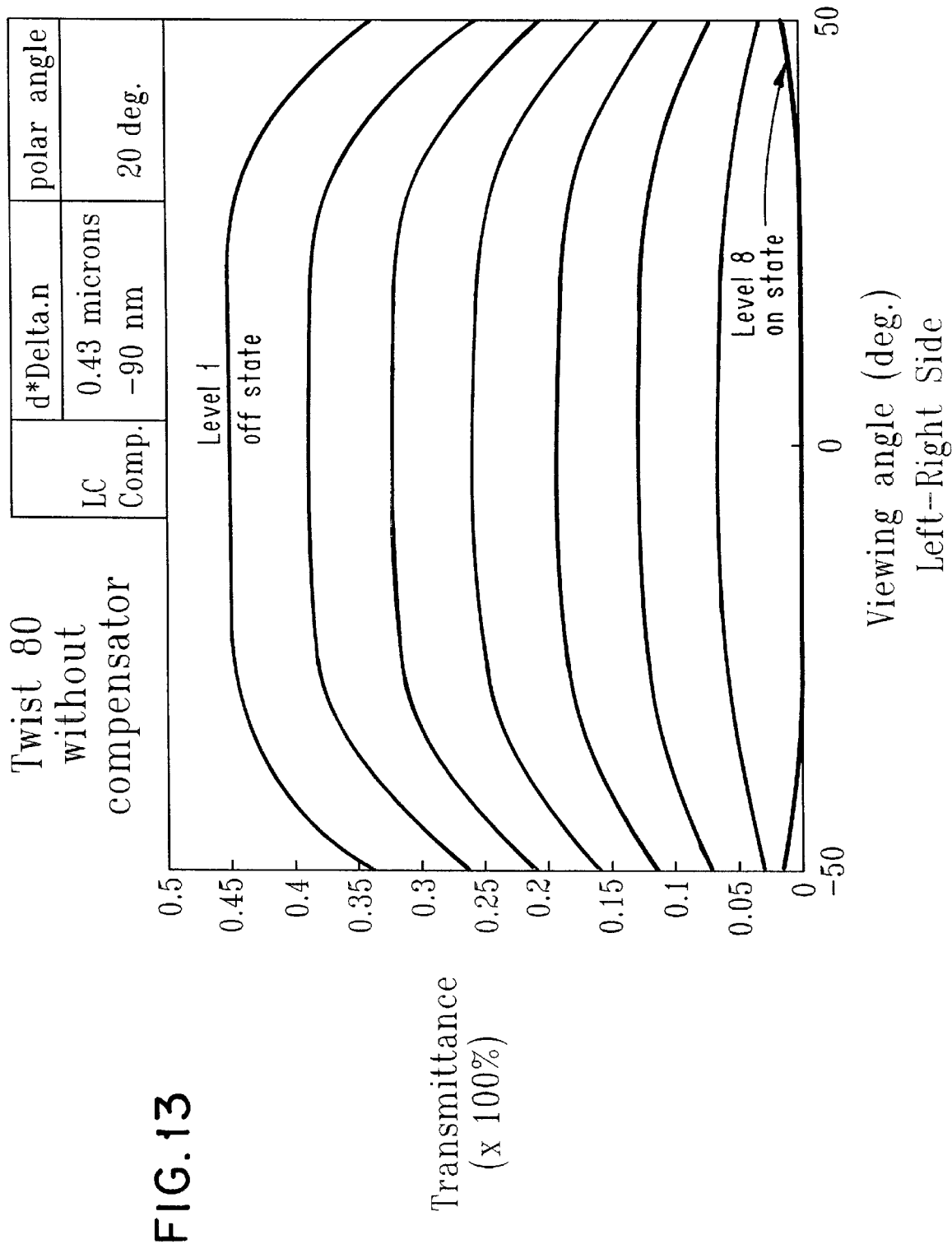
FIG. 13 shows curves for 8-gray level transmittances versus the horizontal viewing angle for the 80°-twist cell with optical compensation as shown in FIG. 7.
Figure 14:
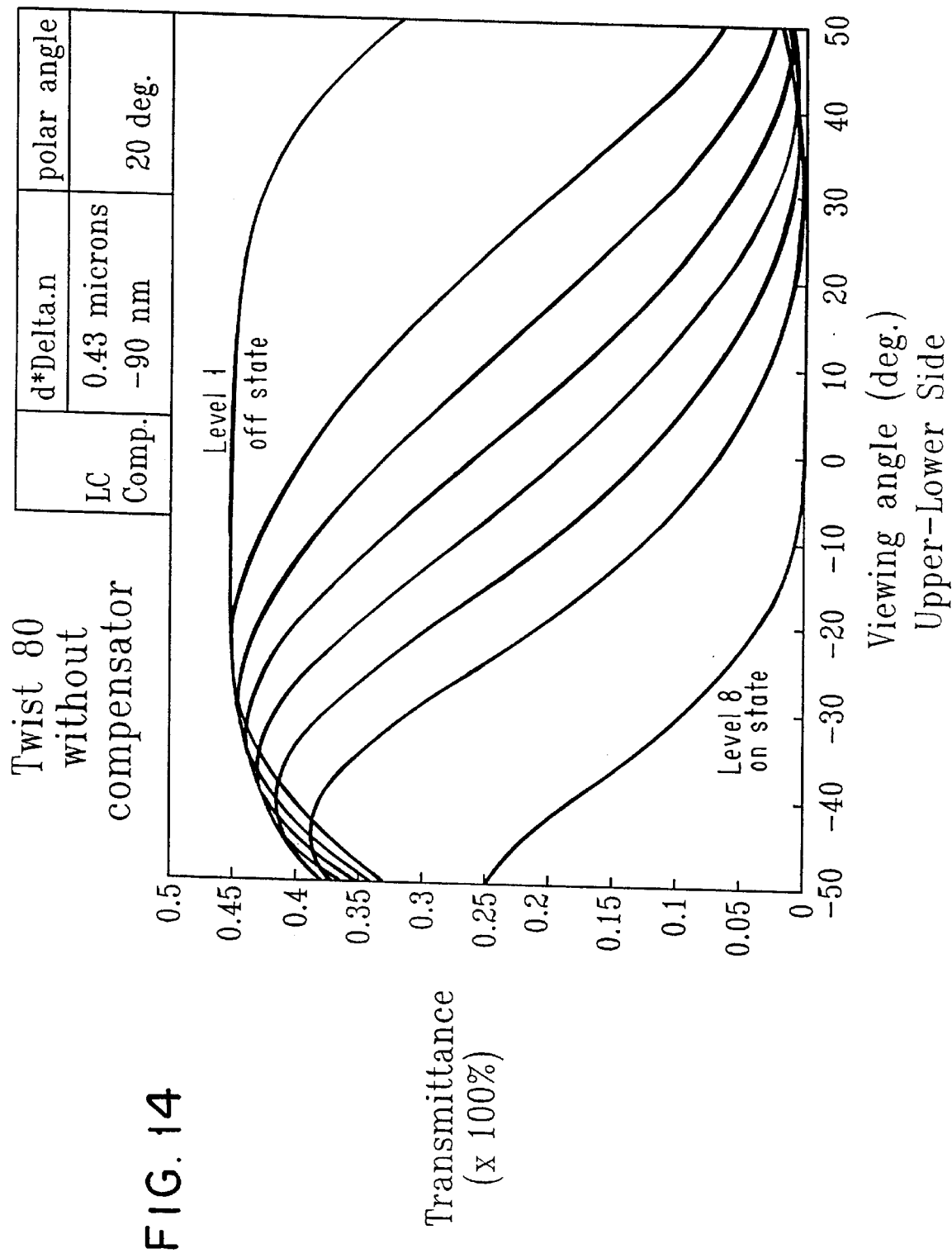
FIG. 14 shows curves for 8-gray level transmittances versus the vertical viewing angle for the 80°-twist cell with optical compensation as shown in FIG. 7.
Figure 15:
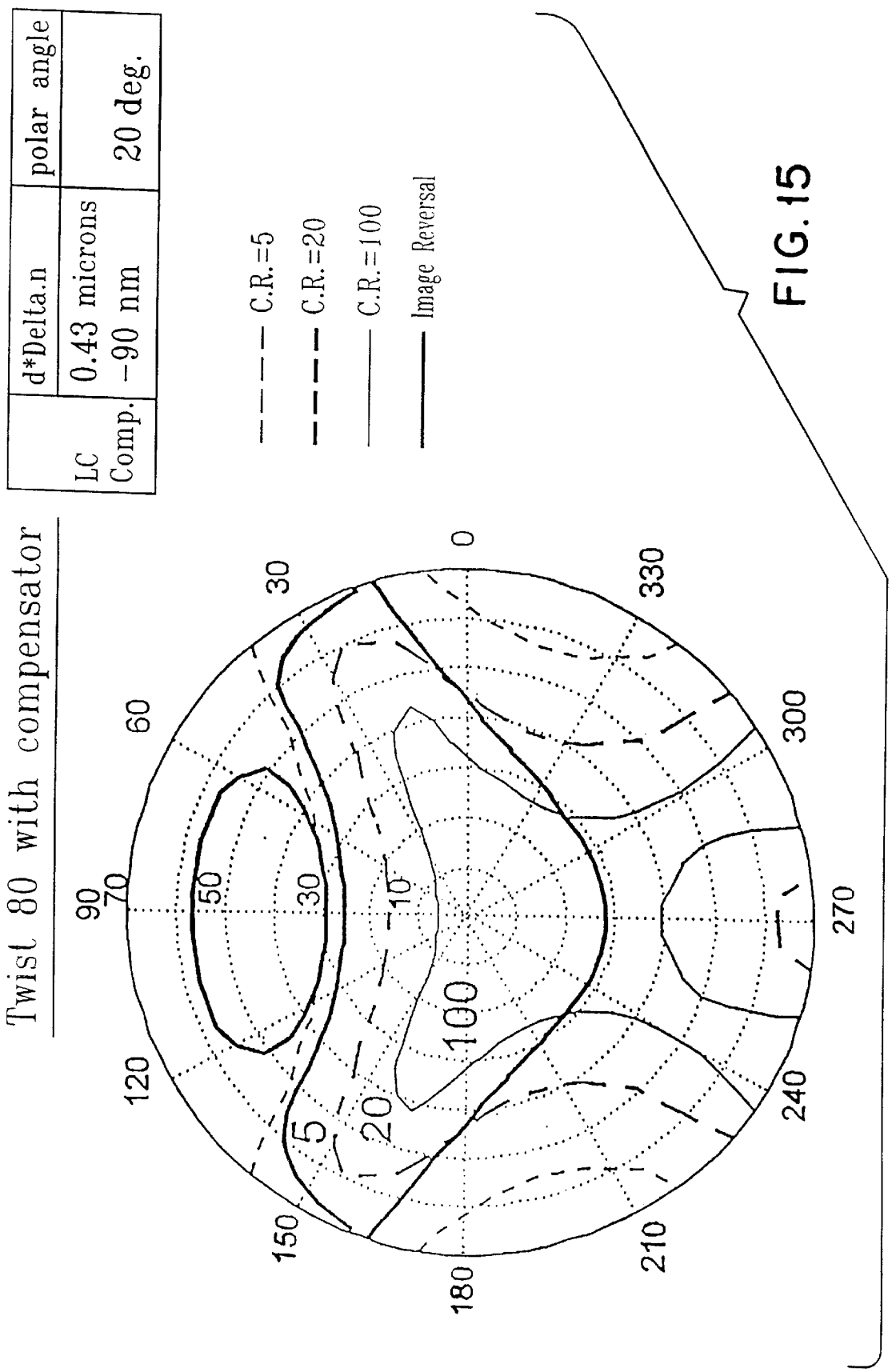
FIG. 15 shows iso-contrast curves and the boundary of image-reversal curves for the 80°-twist cell with optical compensation as shown in FIG. 7.
Figure 16:
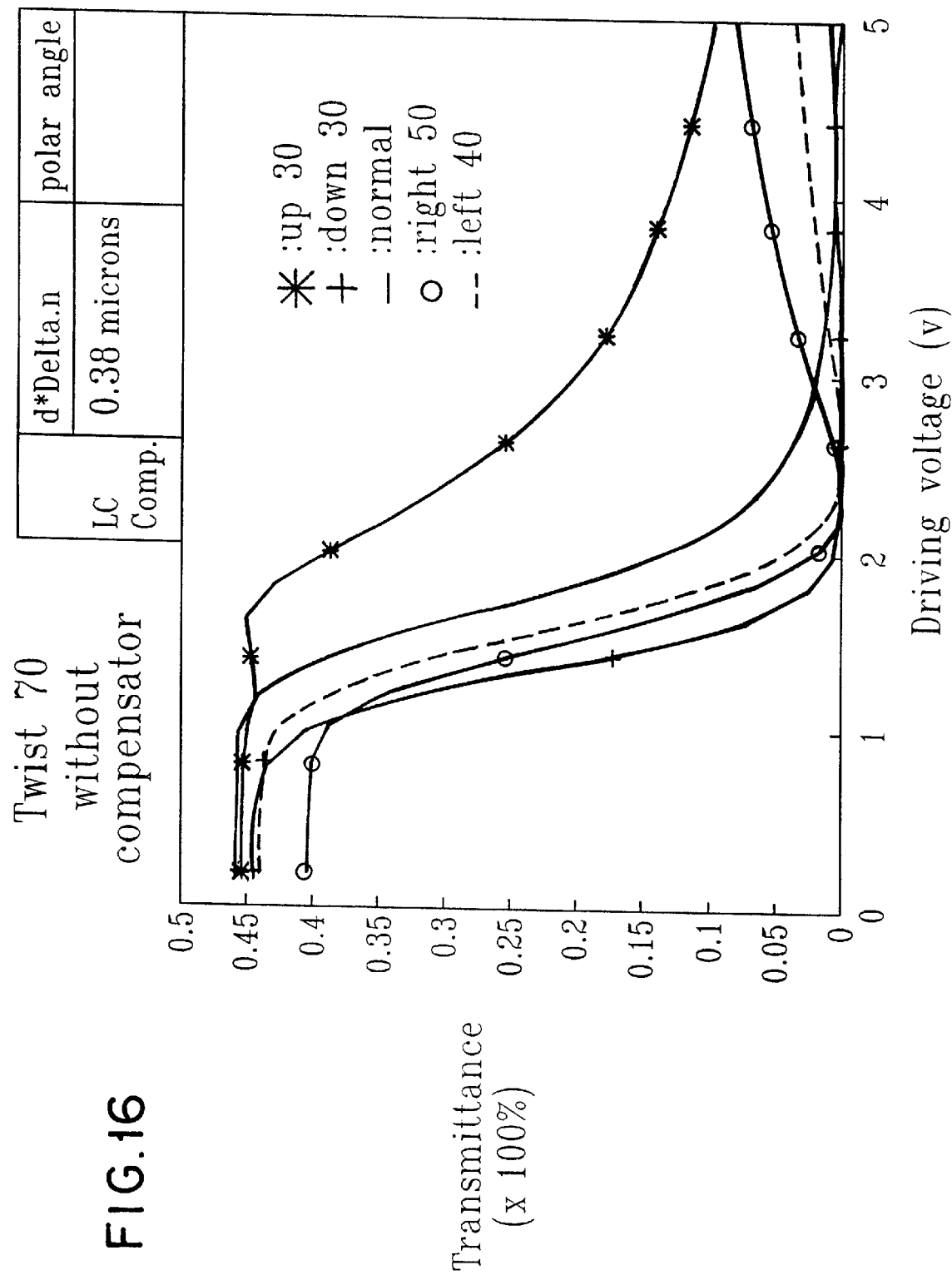
FIG. 16 shows curves of transmittance versus the applied voltage at different viewing directions for the 70°-twist cell.
Figure 17:
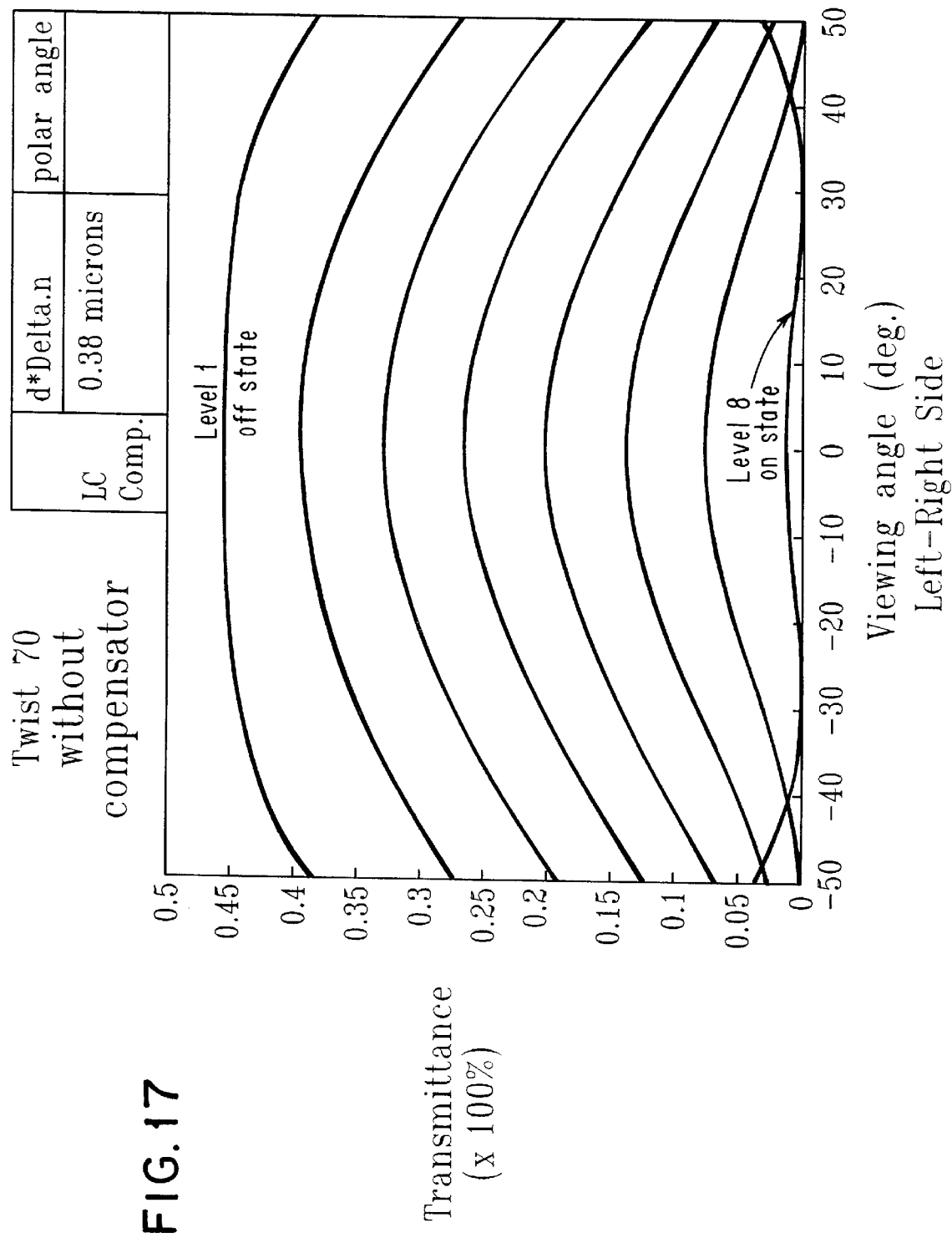
FIG. 17 shows curves for 8-gray level transmittances versus the horizontal viewing angle for the 70°-twist cell.
Figure 18:
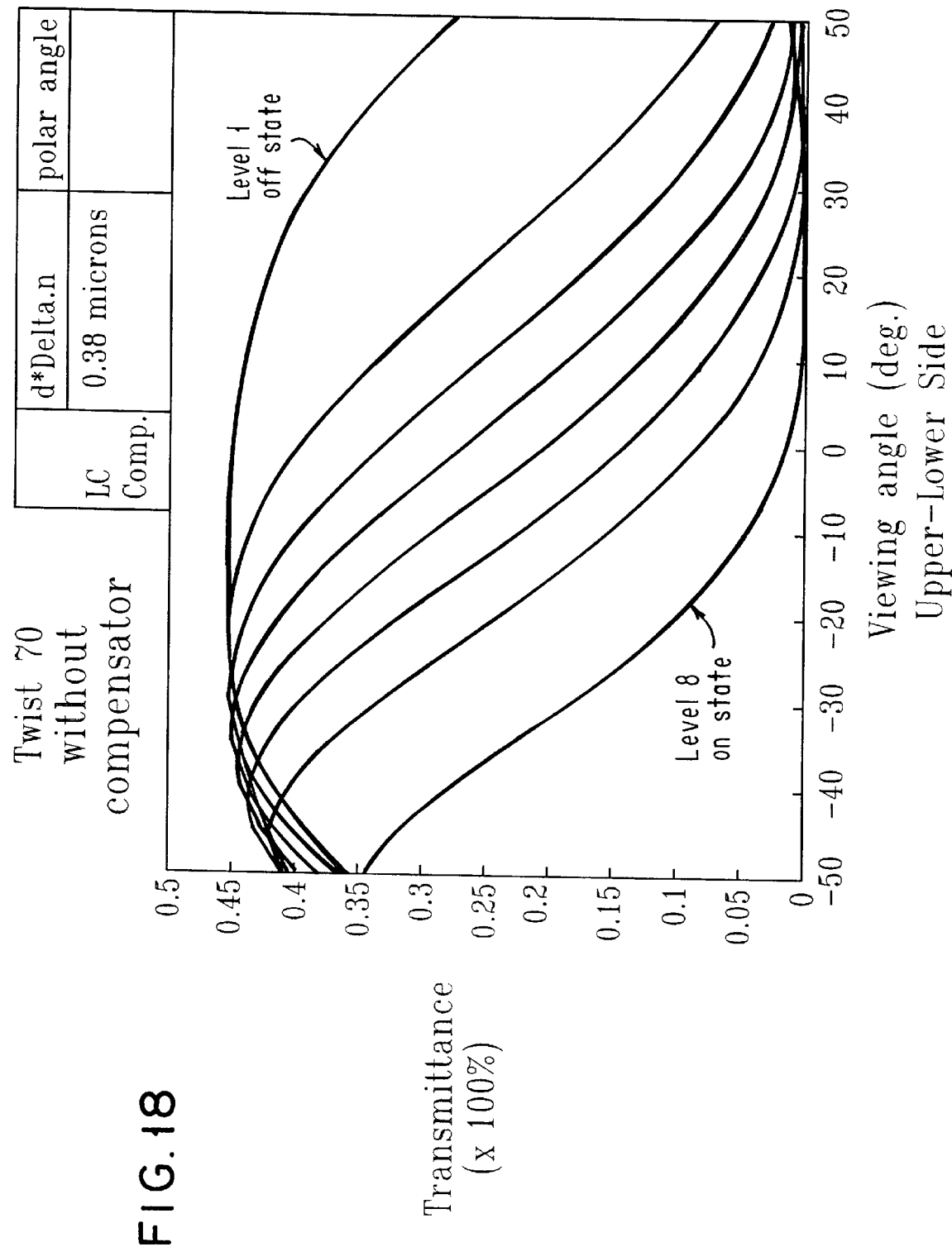
FIG. 18 shows curves for 8-gray level transmittances versus the vertical viewing angle for the 70°-twist cell.

Comparing FIG. 11 with FIG. 15, it can be seen that without compensation, the 80°-twist cell has the best-contrast-ratio direction shifted away from the normal incidence. With compensation, the contrast ratio at normal incidence is improved to a value similar to the case of a regular 90°-twist TN as shown in FIG. 5. Furthermore, the compensation does not degrade the wide-viewing-angle characteristics of the 8°-TN as compared to the regular 90°-TN.

Comparing FIG. 5 with FIG. 15, it can be seen that the compensated 80°-twist cell has a wider viewing angle and about the same contrast ratio at normal incidence as the regular 90°-twist cell.

Figure 19:
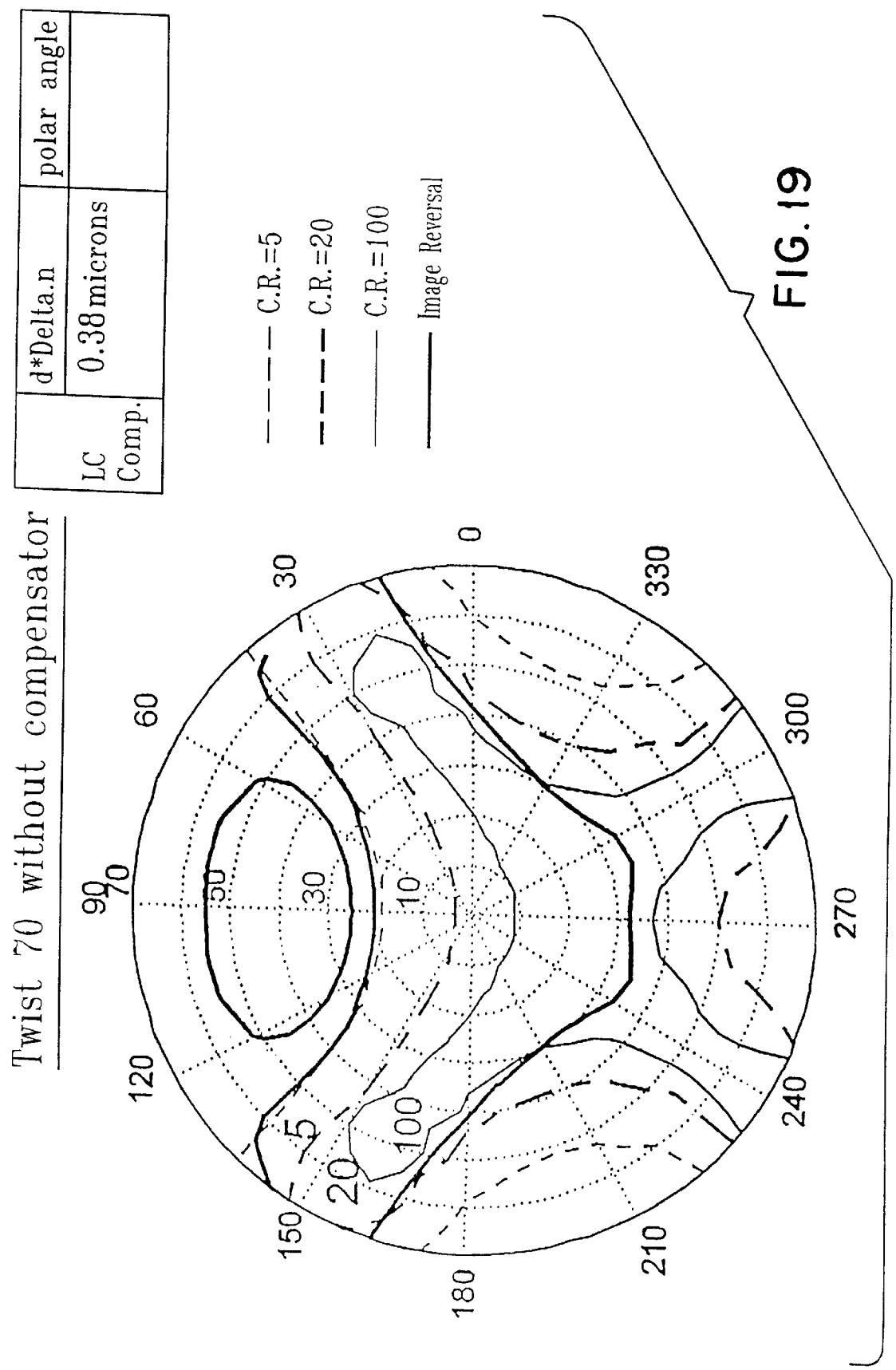
FIG. 19 shows iso-contrast curves and the boundary of image-reversal curves for the 70°-twist cell.
Figure 20:
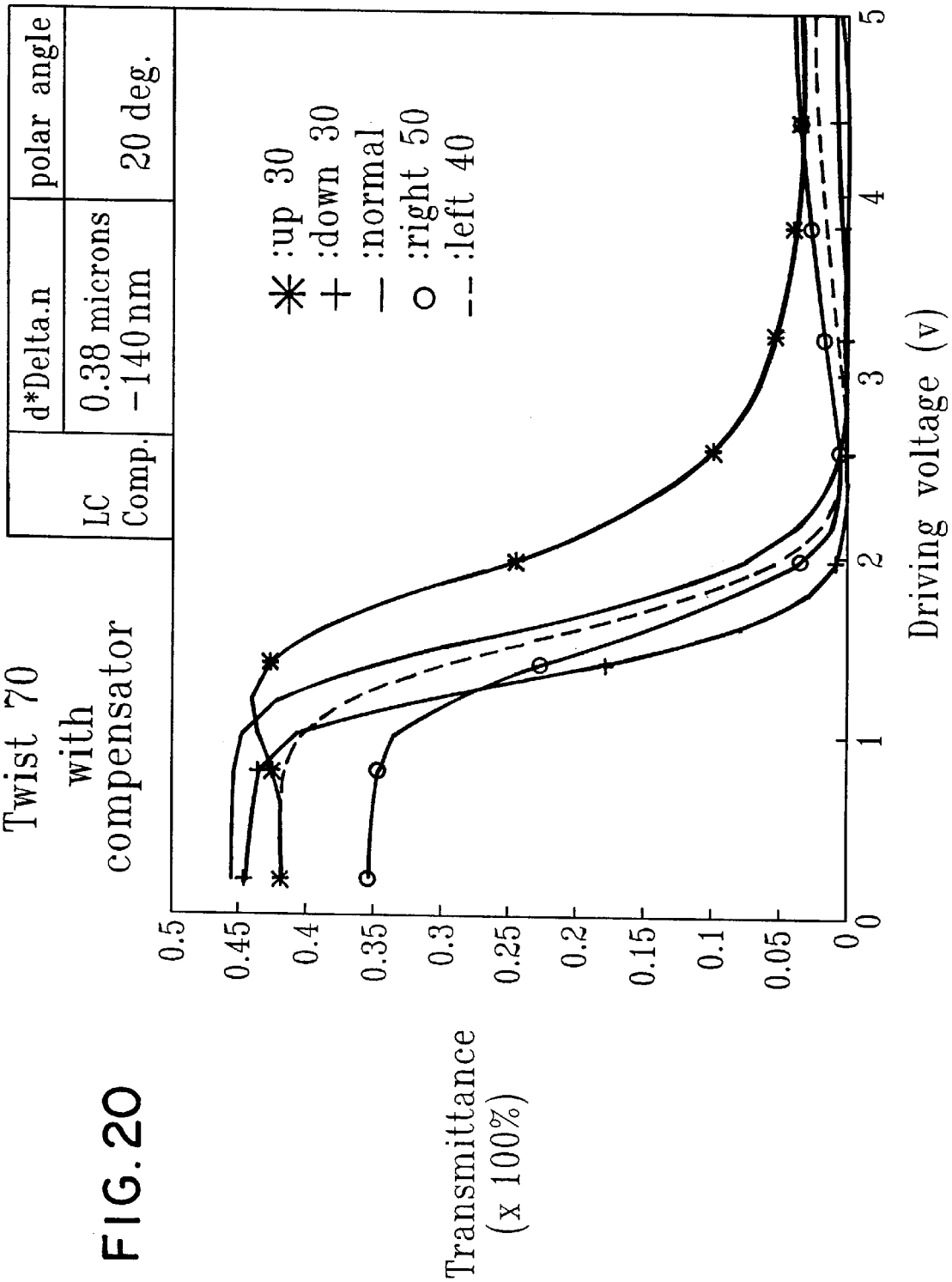
FIG. 20 shows curves of transmittance versus the applied voltage at different viewing directions for the 70°-twist cell with optical compensation as shown in FIG. 7.
Figure 21:
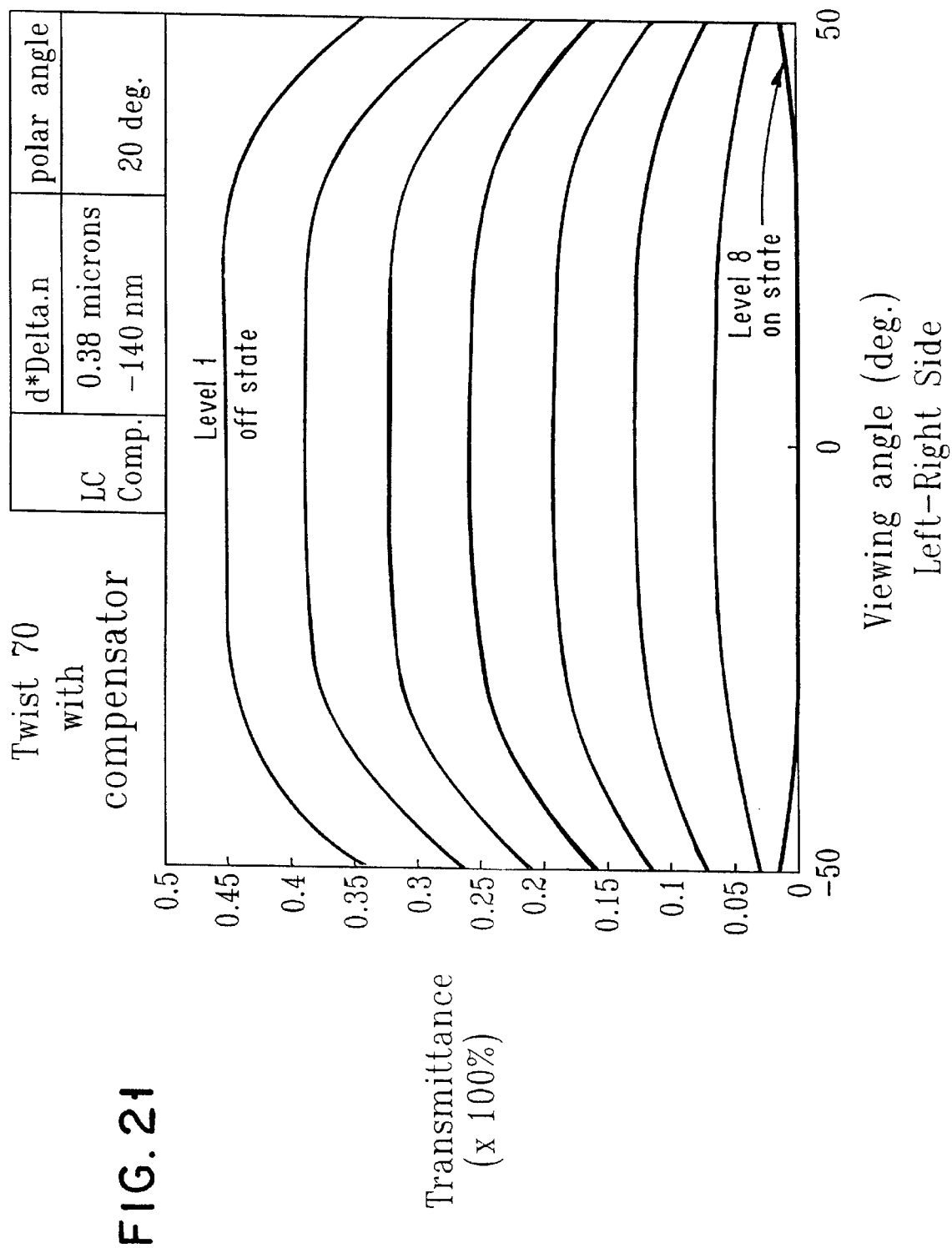
FIG. 21 shows curves for 8-gray level transmittances versus the horizontal viewing angle for the 70°-twist cell with optical compensation as shown in FIG. 7.
Figure 22:
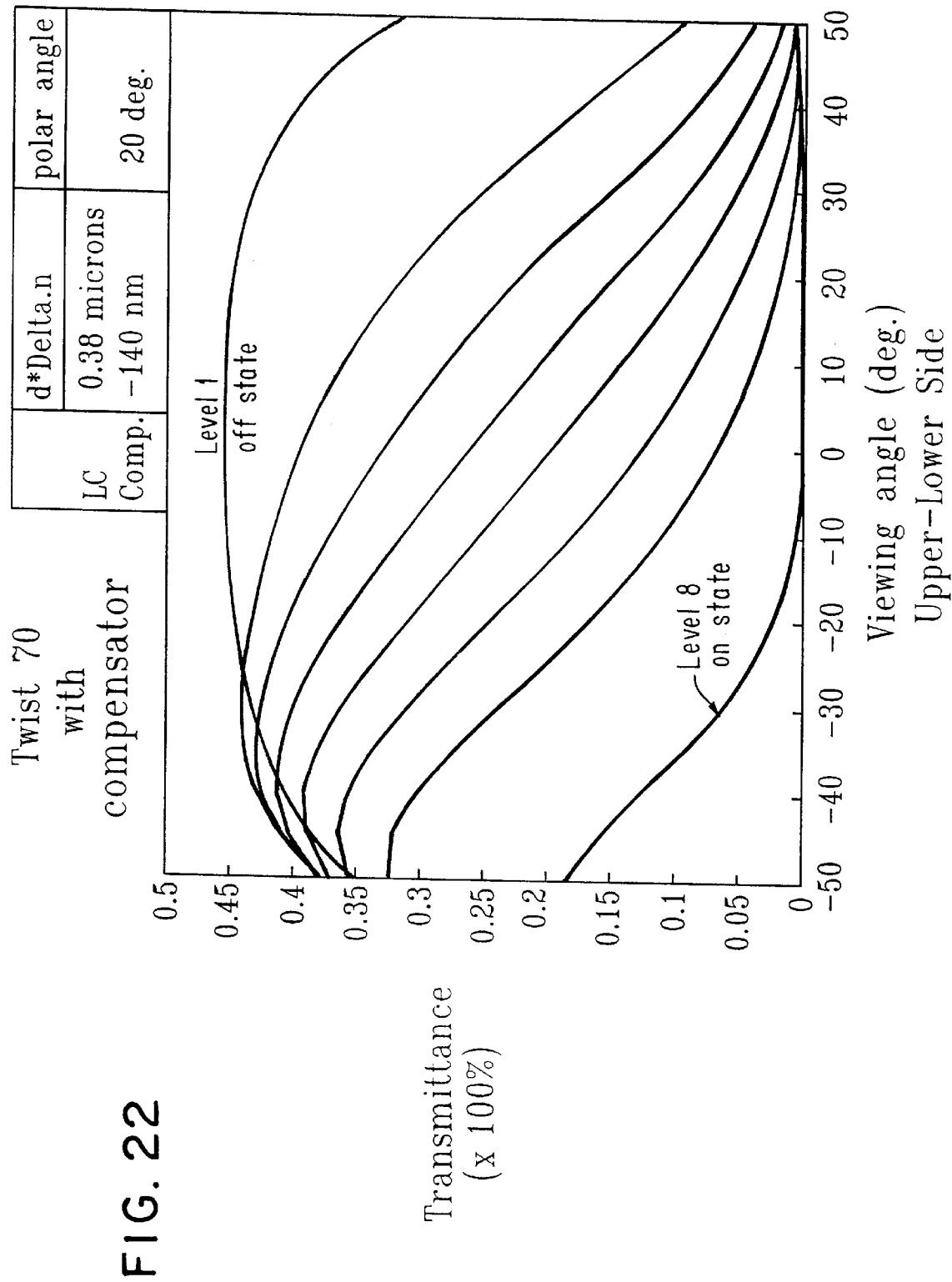
FIG. 22 shows curves for 8-gray level transmittances versus the vertical viewing angle for the 70°-twist cell with optical compensation as shown in FIG. 7.
Figure 23:
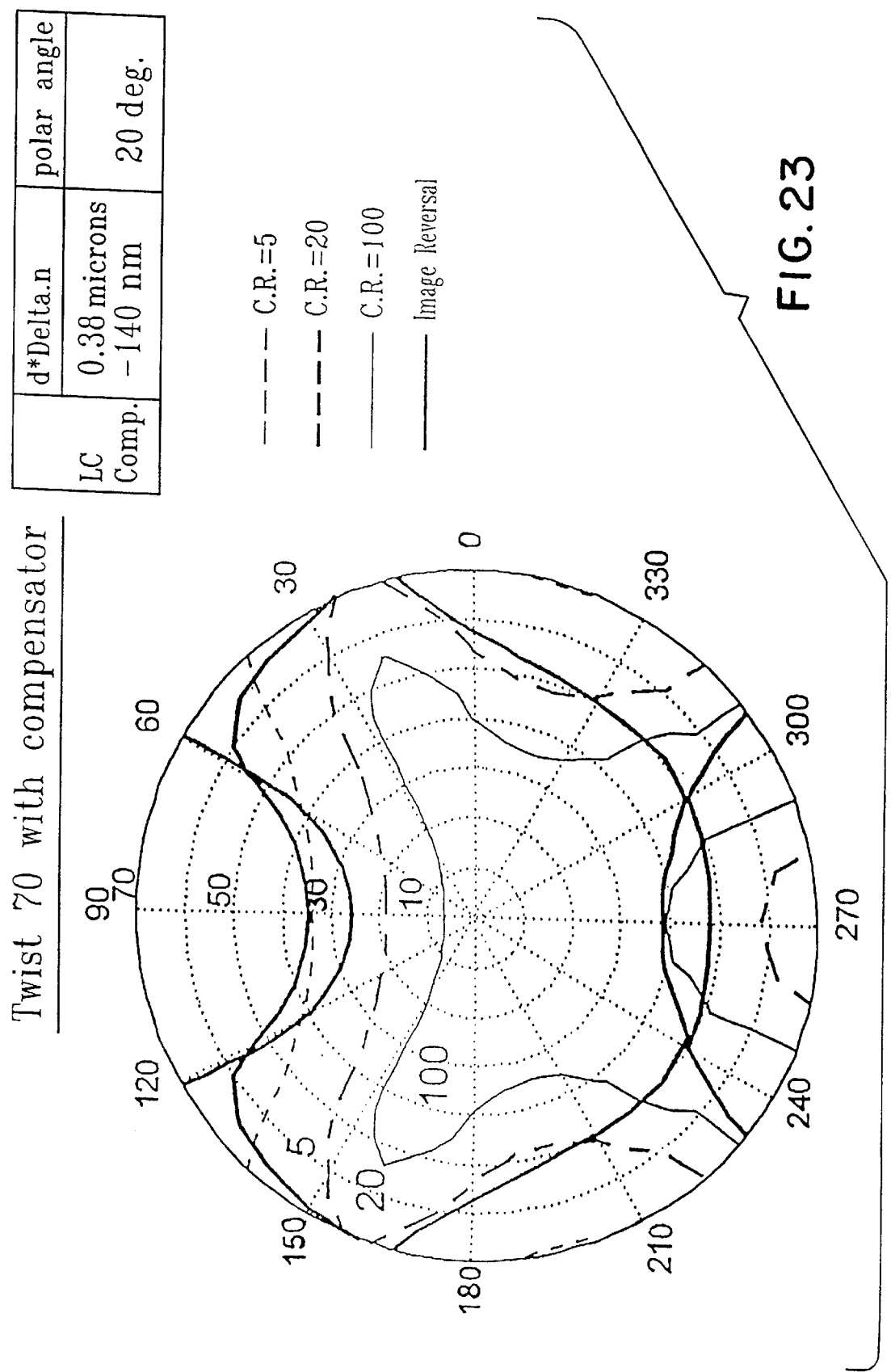
FIG. 23 shows iso-contrast curves and the boundary of image-reversal curves for the 70°-twist cell with optical compensation as shown in FIG. 7.
Figure 24:
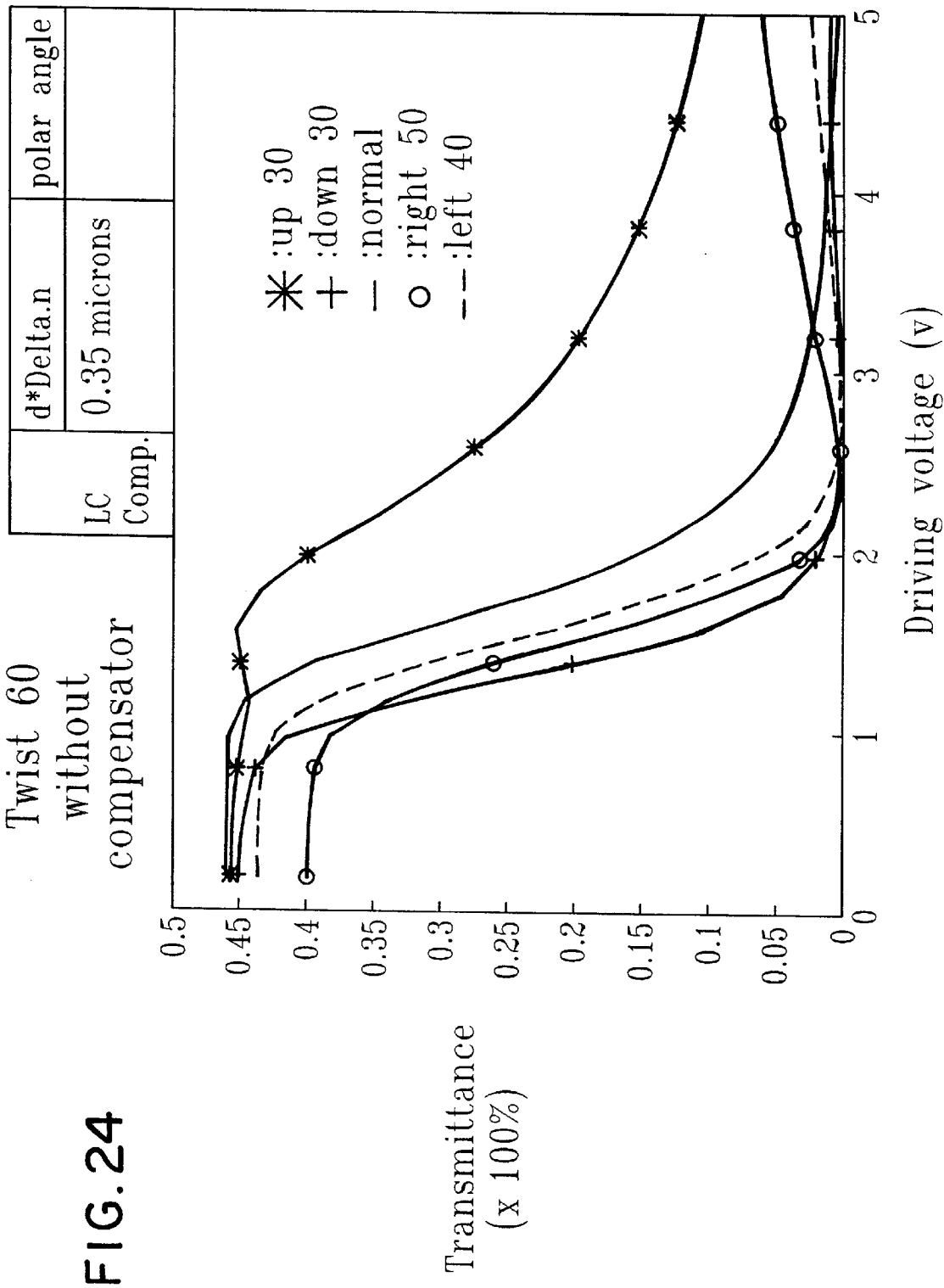
FIG. 24 shows curves of transmittance versus the applied voltage at different viewing directions for the 60°-twist cell.
Figure 25:
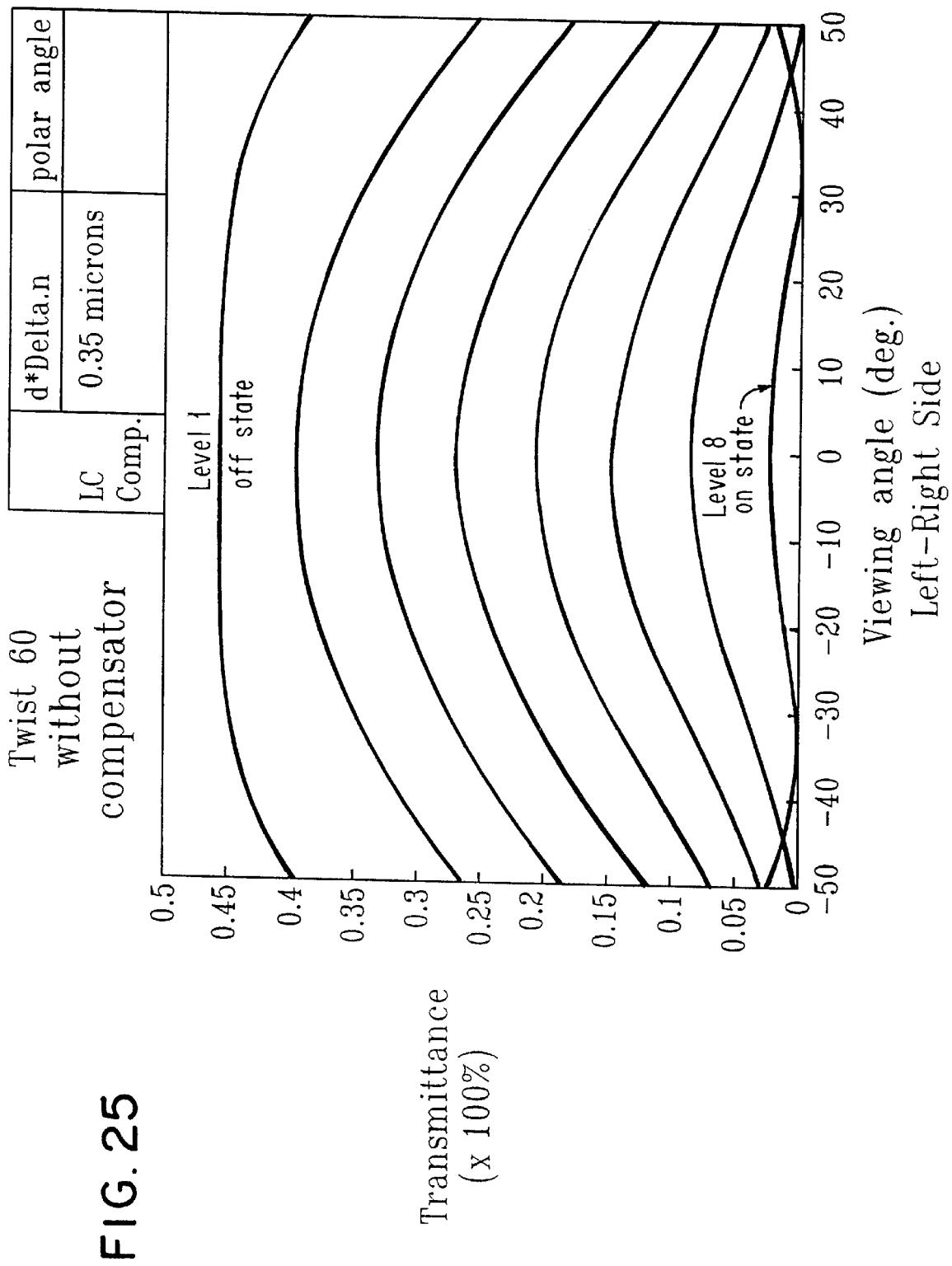
FIG. 25 shows curves for 8-gray level transmittances versus the horizontal viewing angle for the 70°-twist cell.
Figure 26:
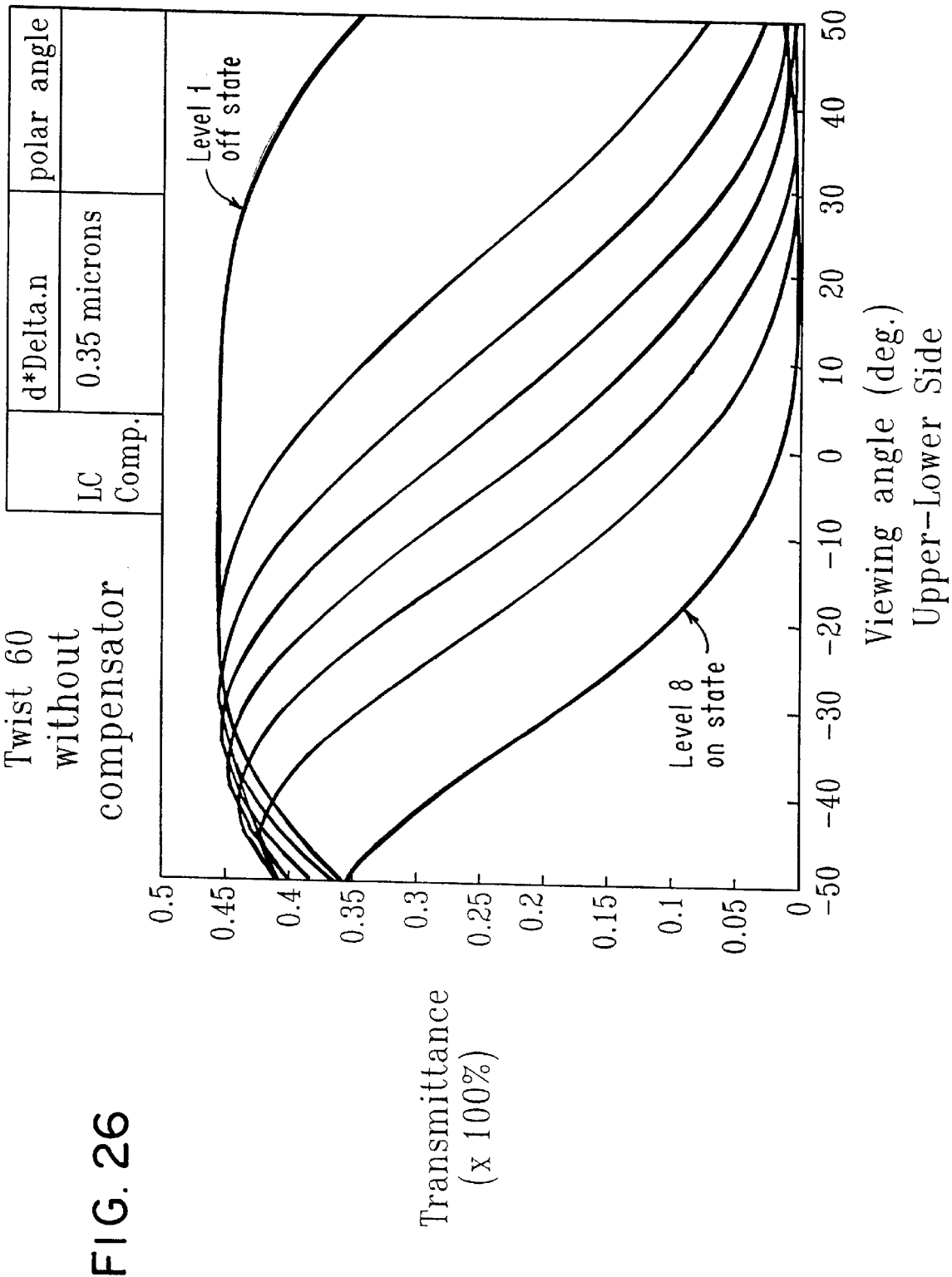
FIG. 26 shows curves for 8-gray level transmittances versus the vertical viewing angle for the 60°-twist cell.

Comparing FIGS. 5, 19 and 23, it can be concluded that the compensated 70°-twist cell has a much wider viewing angle than the regular 90°-TN and has a contrast ratio at normal incidence comparable to that of the regular 90°-TN.

Figure 27:
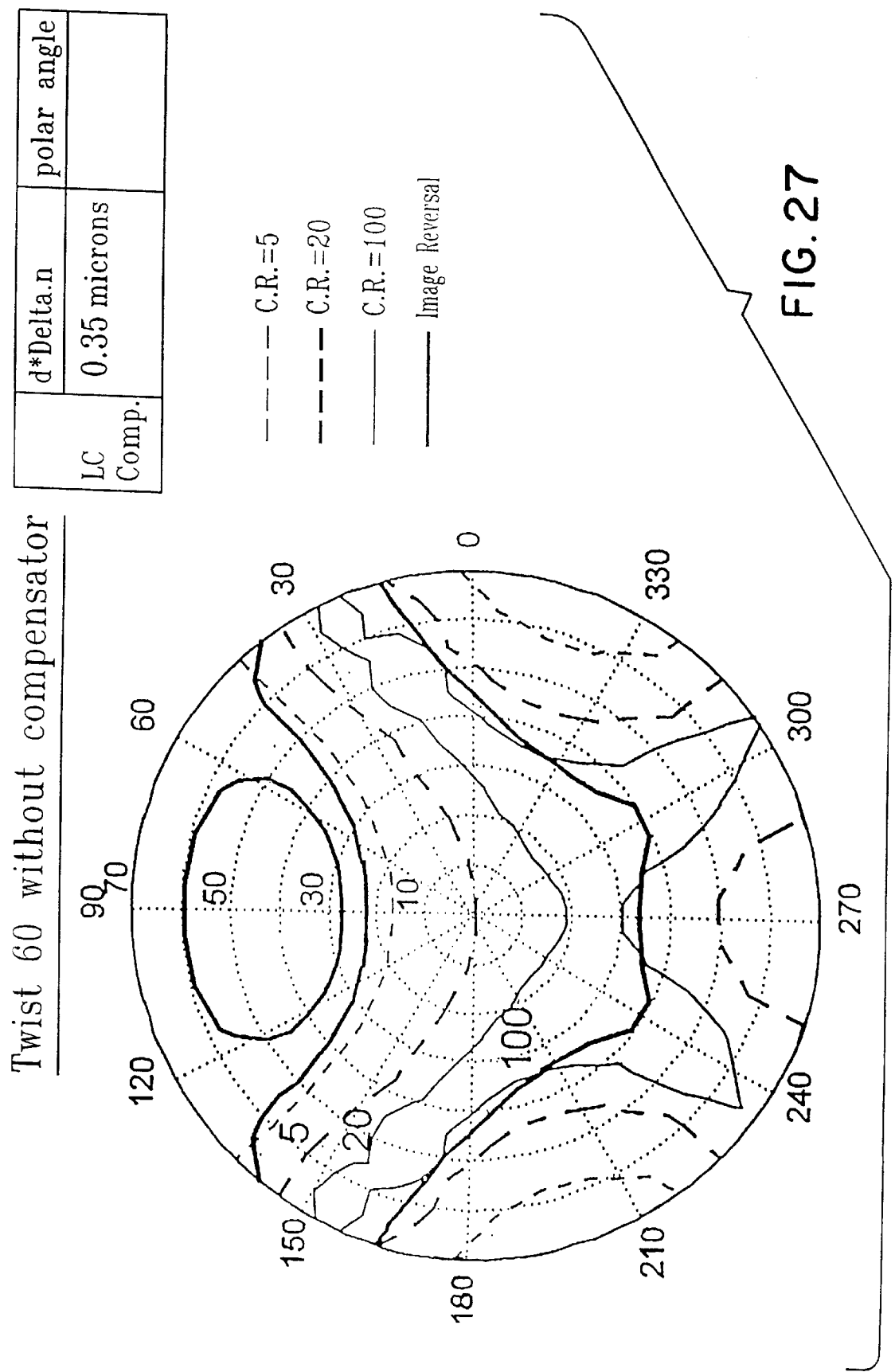
FIG. 27 shows iso-contrast curves and the boundary of image-reversal curves for the 60°-twist cell.
Figure 28:
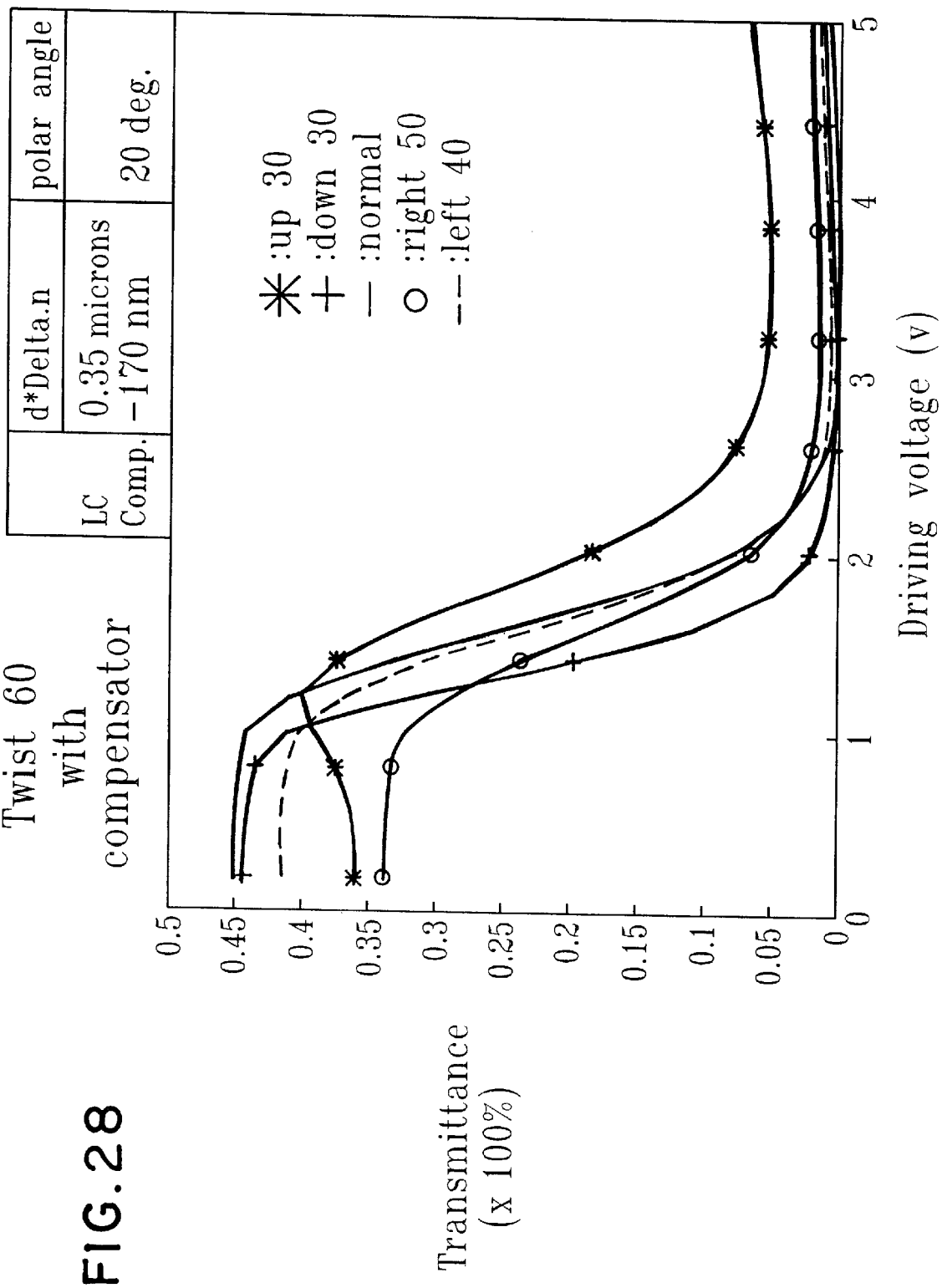
FIG. 28 shows curves of transmittance versus the applied voltage at different viewing directions for the 60°-twist cell with optical compensation as shown in FIG. 7.
Figure 29:
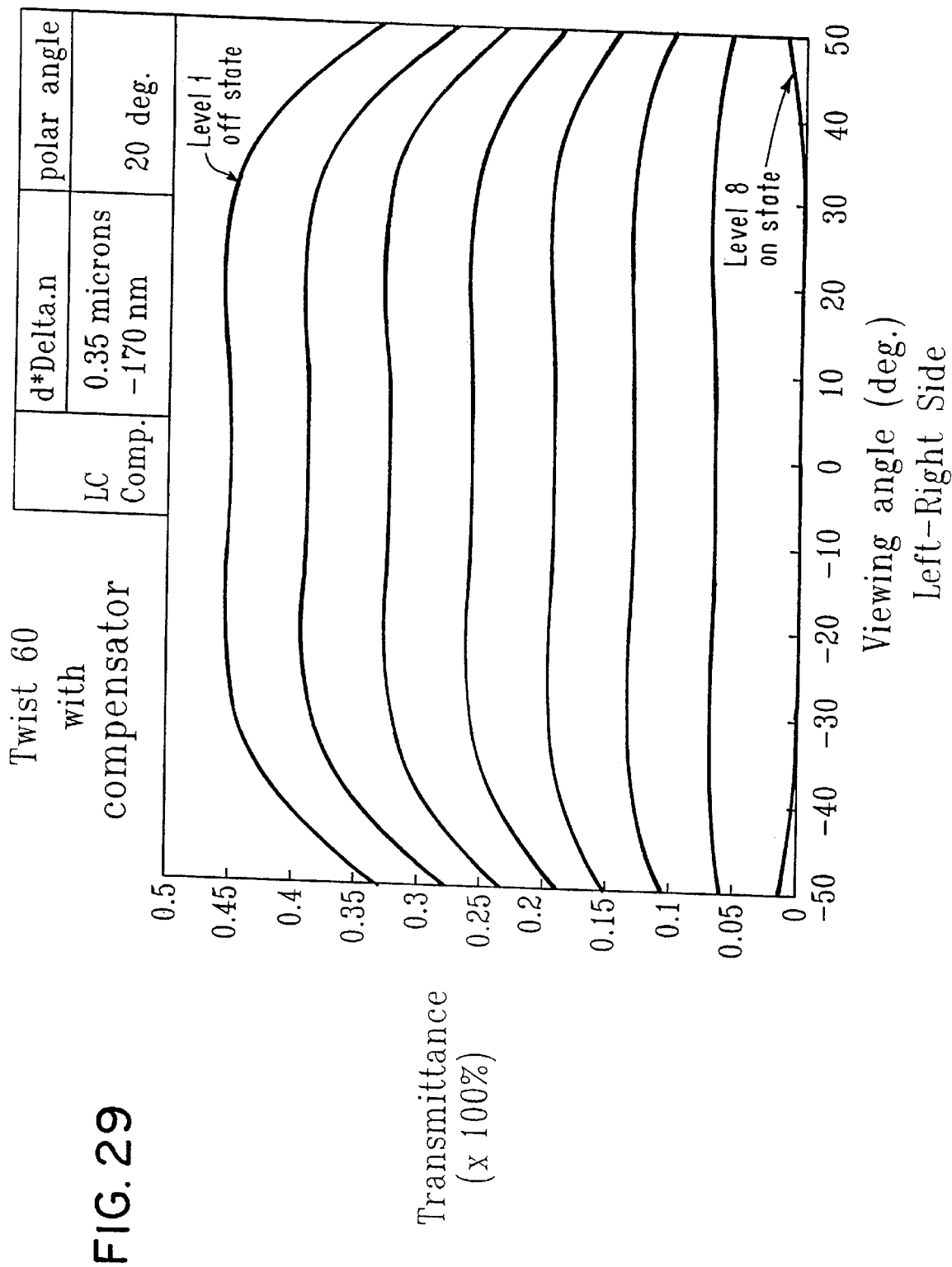
FIG. 29 shows curves for 8-gray level transmittances versus the horizontal viewing angle for the 60°-twist cell with optical compensation as shown in FIG. 7.
Figure 30:
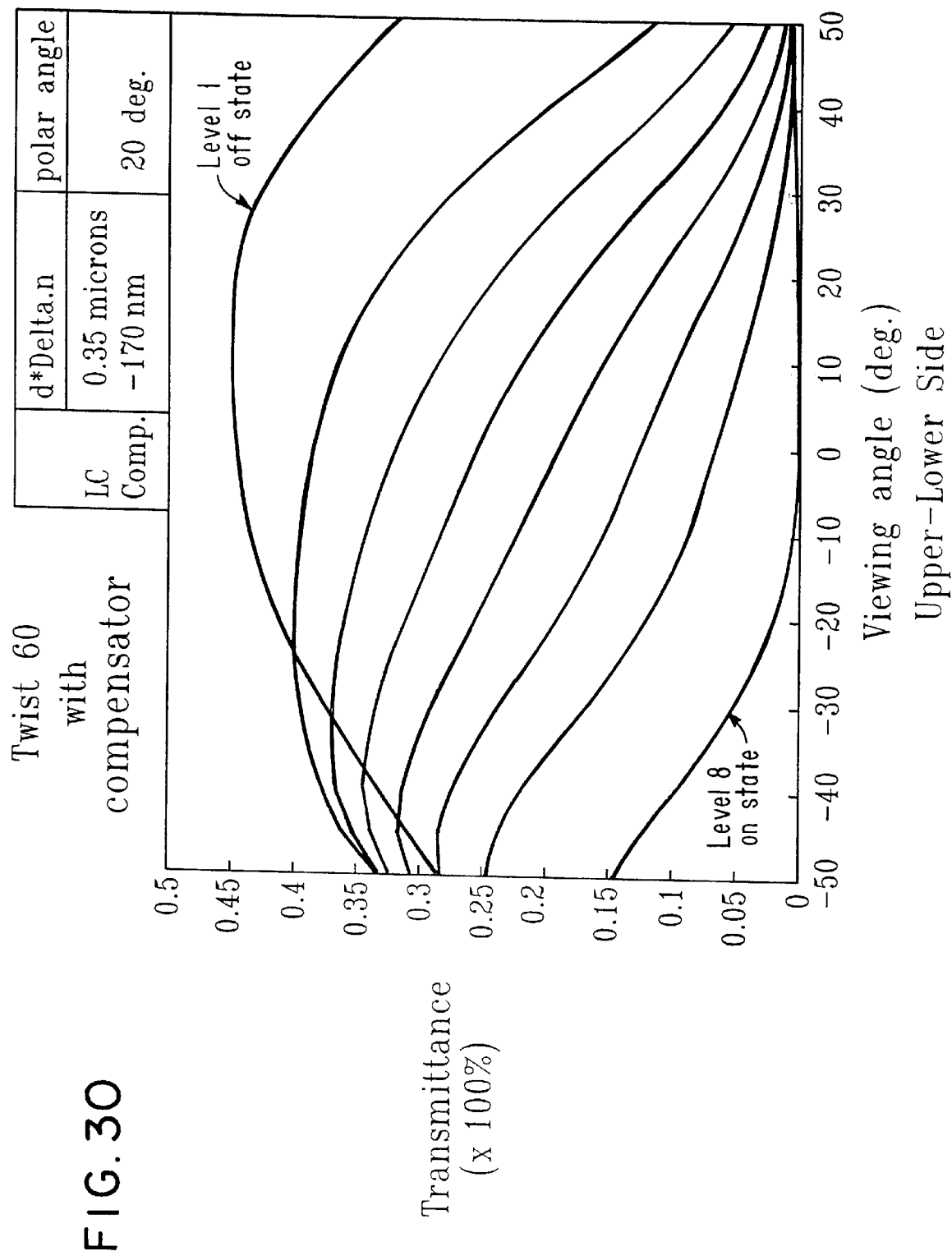
FIG. 30 shows curves for 8-gray level transmittances versus the vertical viewing angle for the 60°-twist cell with optical compensation as shown in FIG. 7.
Figure 31:
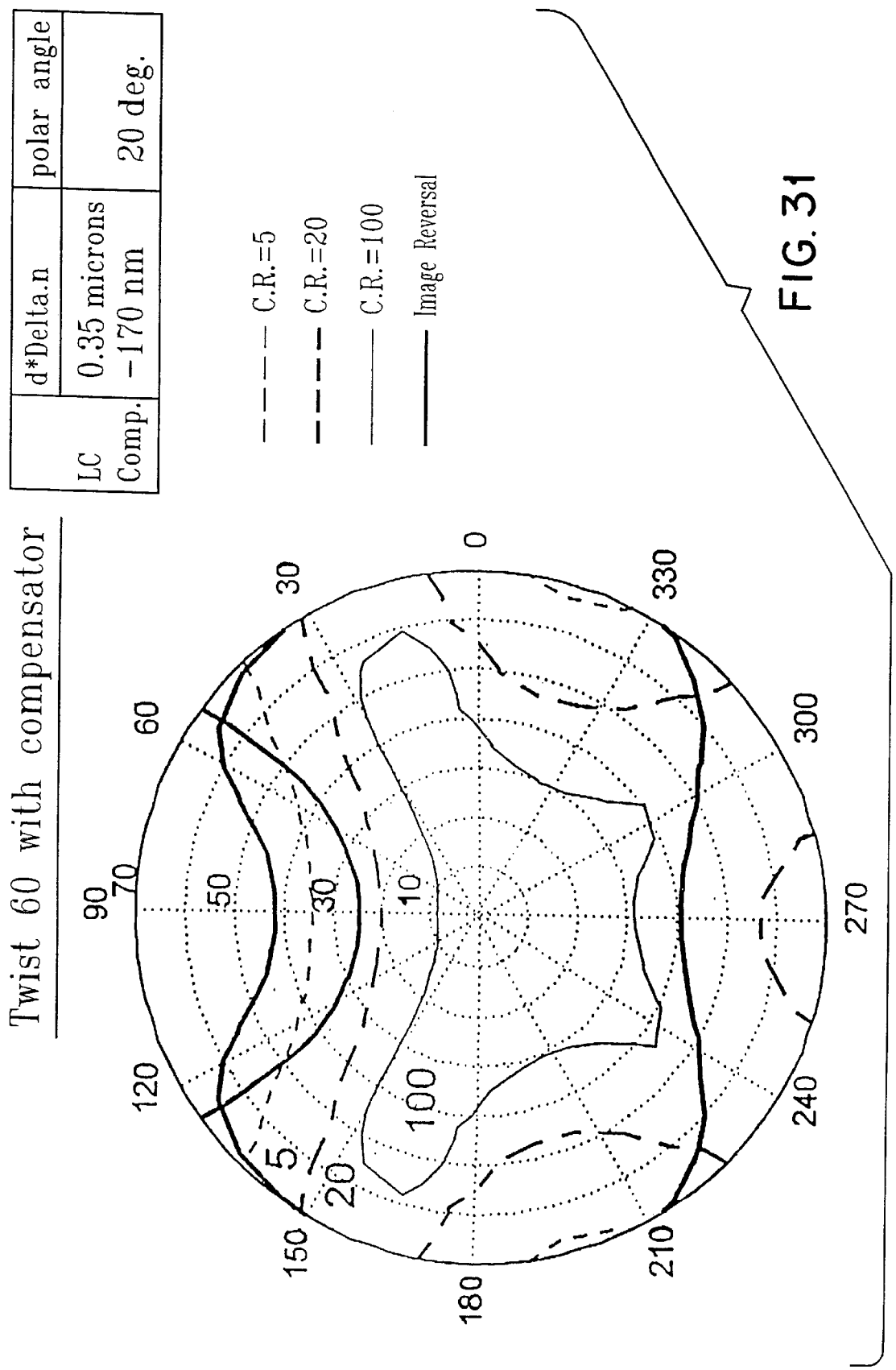
FIG. 31 shows iso-contrast curves and the boundary of image-reversal curves for the 60°-twist cell with optical compensation as shown in FIG. 7.

Similarly, by comparing FIGS. 5, 27 and 31, it can be concluded that the compensated 60°-twist cell has a much wider viewing angle than the regular 90°-TN and has a contrast ratio at normal incidence comparable to that of the regular 90°-TN.

There is one important reason why the present invention, which compensates LTN cells with two optical compensation films with negative birefringence, can improve the viewing angle and shift the viewing zone of the best contrast ratio toward normal incidence. When light propagates inside the quiescent state of the LTN cell, it is influenced by both the polarization-rotation and the birefringent effects caused by the LC medium. When the applied voltage is larger than approximately twice the threshold voltage, the LC directors in the middle of the LTN cell are aligned almost parallel to the cell normal due to the applied electric field. The LC directors adjacent to the substrates are only slightly deformed by the applied electric field because of the rigid-anchoring effect. In this case, the LTN cell is effectively divided into two equivalent halves with each half being adjacent to one-substrate boundary. Each half behaves independently as an optical birefringent plate with positive birefringence. In the present invention, two optical compensation films with negative birefringence have been used to effectively reduce the birefringent effect of the LTN cell under a relatively strong electric field, resulting in better viewing angle and a shift of the best-contrast zone toward the normal incidence.

While several embodiments and variations of the present invention for low-twist-angle nematic liquid crystal cells with optical compensation for wide-viewing-angle applications are described in detail herein, it should be apparent that the disclosure and teachings of the present invention will suggest many alternative designs to those skilled in the art.

Having thus described the invention, what is claimed as new and desired to be secured by Letters Patent is:

1. A liquid crystal display for viewing at different angles with respect to a normal axis perpendicular to the display comprising:
   a. a polarizer layer having an absorption axis and a transmission axis perpendicular to the absorption axis;
   b. an analyzer layer having an absorption axis substantially perpendicular to the absorption axis of the polarizer layer and a transmission axis perpendicular to the absorption axis of the analyzer layer;
   c. a liquid crystal cell disposed along a substrate plane between the polarizer layer and the analyzer layer, and having a liquid crystal medium therein between first and second sides of the liquid crystal cell which defines a twist angle φ, and liquid crystal directors exhibiting a small pretilt angle from the substrate plane and an azimuthal twist angle through the liquid crystal medium with respect to an axis perpendicular to the substrate plane;
   d. a first electrode proximate to the first side of the liquid crystal cell, a second electrode proximate to the second side of the liquid crystal cell, wherein the first and second electrodes apply a voltage across the liquid crystal medium;
   e. a first optical compensator having a negative birefringence and an optical axis disposed between the polarizer layer and the liquid crystal cell;
   f. a second optical compensator having a negative birefringence and an optical axis disposed between the analyzer layer and the liquid crystal cell, whereby projections of the optical axes of the first and second optical compensators onto a plane defined by each optical compensator bisect the angle defined between the transmission axes of the polarizer layer and the analyzer layer, and also bisect the azimuthal twist angle of the liquid crystal medium.

2. The liquid crystal display as claimed in claim 1, wherein the liquid crystal medium has a positive dielectric anisotropy.

3. The liquid crystal display as claimed in claim 1, wherein the liquid crystal medium has a twist angle φ in the range from 30° to 85°.

4. A liquid crystal display as claimed in claim 1, wherein the liquid crystal medium has a dΔn from 0.2 to 0.55 μm, where d and Δn are the cell gap and the birefringence of the liquid crystal medium, respectively.

5. A liquid crystal display as claimed in claim 1, wherein the first and second optical compensators have a retardation in the range from −20 to −400 nm.

6. A liquid crystal display as claimed in claim 1, wherein the optical axes of the first and second optical compensators define a tilt angle in the range from 5 to 85° from a normal to the optical compensator.

7. A liquid crystal display as claimed in claim 6, wherein the tilt angle of the optical axis of the first optical compensator is approximately equal to the tilt angle of the optical axis of the second optical compensator.

8. A liquid crystal display as claimed in claim 6, wherein the azimuthal twist angle through the liquid crystal medium is approximately 80°, with dΔn of the liquid crystal medium having values in the range from 0.40 to 0.46 μm, where d is the cell gap of the liquid crystal cell and Δn is the birefringence of the liquid medium, the first and second optical compensators have retardations in the range from −60 nm −120 nm, and the tilt angles of the optical axes of the first and second optical compensators is in the range from 10 to 40° from a normal to the first and second optical compensators.

9. A liquid crystal display as claimed in claim 6, wherein the azimuthal twist angle through the liquid crystal medium is approximately 70°, with dΔn of the liquid crystal medium having values in the range from 0.35 to 0.44 μm, where d is the cell gap of the liquid crystal cell and Δn is the birefringence of the liquid crystal medium, the first and second optical compensators have retardations in the range from −140 to −180 nm, and the tilt angles of the optical axes of the first and second optical compensators is in the range from 10 to 40° from a normal to the first and second optical compensators.

10. A liquid crystal display as claimed in claim 6, wherein the azimuthal twist angle through the liquid crystal medium is approximately 60°, with dΔn of the liquid crystal medium having values in the range from 0.32 to 0.43 μm, where d is the cell gap of the liquid crystal cell and Δn is the birefringence of the liquid crystal medium, the first and second optical compensators have retardations in the range from −120 to −220 nm, and the tilt angles of the optical axes of the first and second optical compensators is in the range from 10 to 40° from a normal to the first and second optical compensator.

11. A liquid crystal display as claimed in claim 1, wherein the first and second optical compensators are each formed by an optical compensation film comprised of a uniaxial optical material with negative birefringence, where the index of refraction along an optical axis, 'ne', is smaller than the index of refraction perpendicular to the optical axis, 'no', and the optical axis of the optical compensation film tilts with an angle ⊖ with respect to a normal to the film.

12. A liquid crystal display as claimed in claim 11, wherein the tilt angle e is in a range of from 10 to 40°.

13. A liquid crystal display as claimed in claim 11, wherein the optical compensation films are of discotic liquid crystalline material or discotic liquid crystalline polymers having one or more of the components hexa-n-alkanoates of benzene, hexa-substituted anthraquinones, tri-substituted benzenes, bipyrene derivatives, scyllo-inosithe hexa-acetate, and octa-substituted phthalocyanide derivatives.

14. A liquid crystal display as claimed in claim 1, wherein said small pretilt angle of said liquid crystal directors is less than 10°.

* * * * *